(12) United States Patent
Cheng

(10) Patent No.: US 6,814,368 B2
(45) Date of Patent: Nov. 9, 2004

(54) FOLDABLE STROLLER

(76) Inventor: Pao-Hsien Cheng, No. 139, Jen Yi 1st Street, Jen Te Hsiang., Tainan Hsien (TW)

( * ) Notice: Subject to any disclaimer, the term of this patent is extended or adjusted under 35 U.S.C. 154(b) by 107 days.

(21) Appl. No.: 10/212,157

(22) Filed: Aug. 6, 2002

(65) Prior Publication Data

US 2004/0026895 A1 Feb. 12, 2004

(51) Int. Cl.[7] .................................................. B62B 1/00
(52) U.S. Cl. ...................................................... 280/642
(58) Field of Search ................................. 280/642, 647, 280/643, 648, 649, 650, 657, 658, 47, 38, 47.4, 644, 62

(56) References Cited

U.S. PATENT DOCUMENTS

| 4,118,052 | A | * | 10/1978 | Cabagnero | 280/642 |
| 4,232,897 | A | * | 11/1980 | Maclaren et al. | 297/45 |
| 4,542,916 | A | * | 9/1985 | Kassai | 280/642 |
| 4,618,184 | A | * | 10/1986 | Harvey | 297/19 |
| 4,986,564 | A | * | 1/1991 | Liu | 280/642 |
| 5,221,106 | A | * | 6/1993 | Shamie | 280/644 |
| 5,863,061 | A | * | 1/1999 | Ziegler et al. | 280/642 |
| 6,102,432 | A | * | 8/2000 | Cheng | 280/642 |
| 6,322,098 | B1 | * | 11/2001 | Lan | 280/642 |
| 6,428,034 | B1 | * | 8/2002 | Bost | 280/650 |
| 2002/0113414 | A1 | * | 8/2002 | Tomasi et al. | 280/650 |

* cited by examiner

Primary Examiner—Bryan Fischmann
(74) Attorney, Agent, or Firm—Rosenberg, Klein & Lee

(57) ABSTRACT

A foldable stroller has a handle and a primary frame consisting of both a front and a rear member. The handle can be folded to reduce the width of the stroller for storage purposes. When the handle is folded, lateral tubes of the handle are unlocked so that the handle can be moved close to the frame and thereby reduce the height of the stroller. The members of the frame are pivoted on each other so as to reduce the length of the stroller when the stroller is folded. A force exerted on the handle and on the members of the frame can be imparted to each other via an operating rod combination pivoted to the frame so that the pivotally connected parts can be moved close to each other with increased smoothness of the folding process.

14 Claims, 24 Drawing Sheets

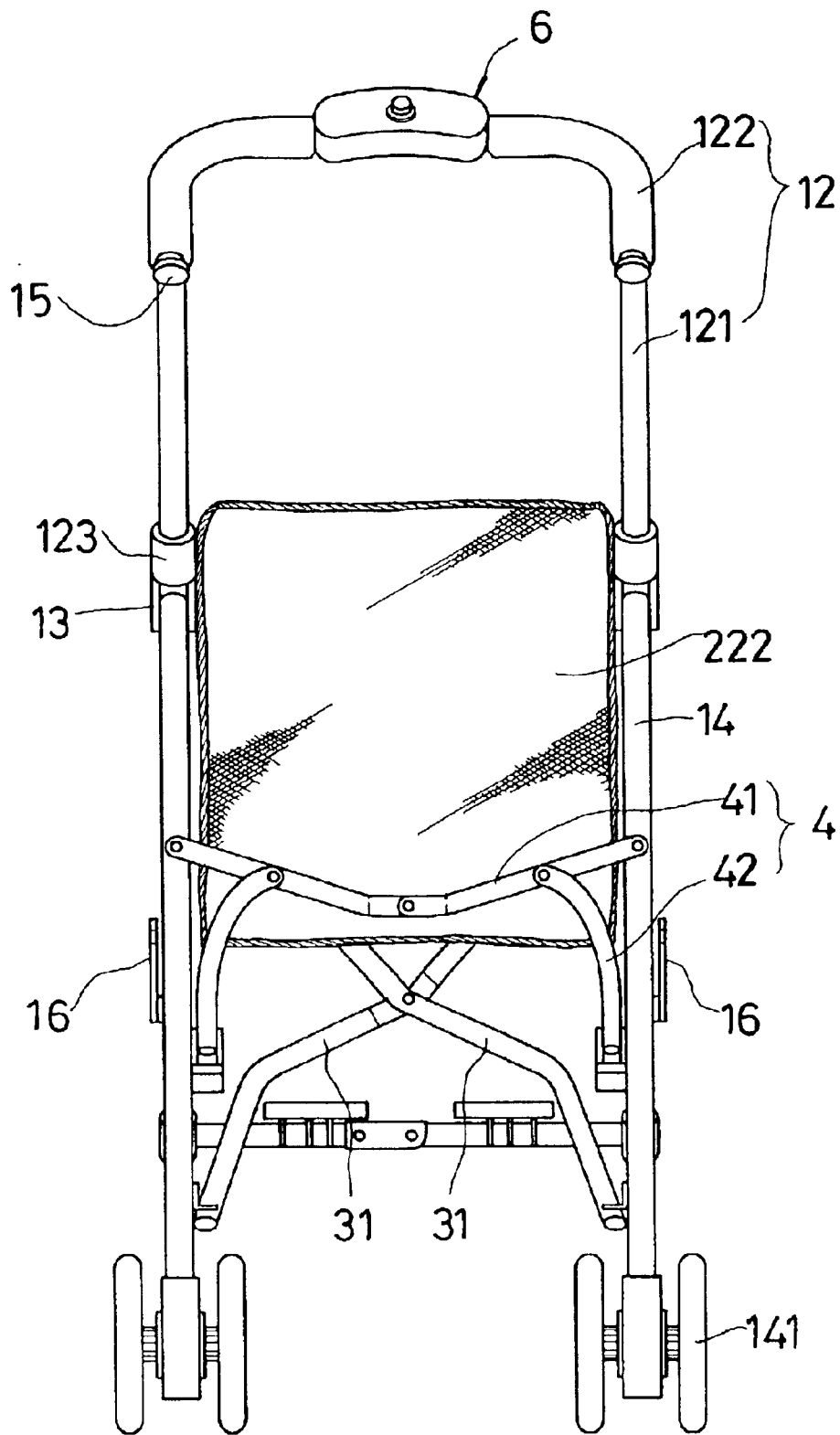
F I G. 4

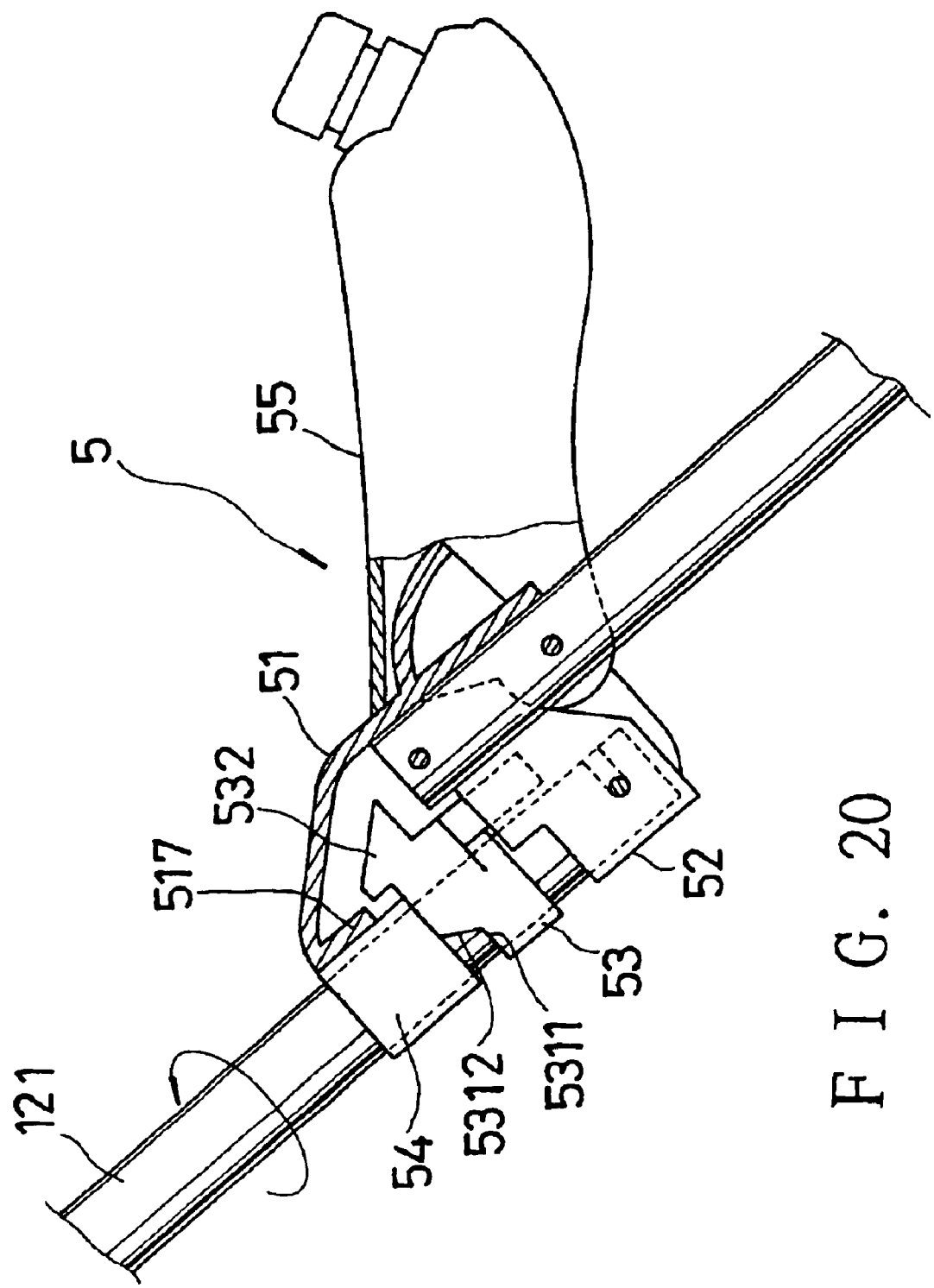

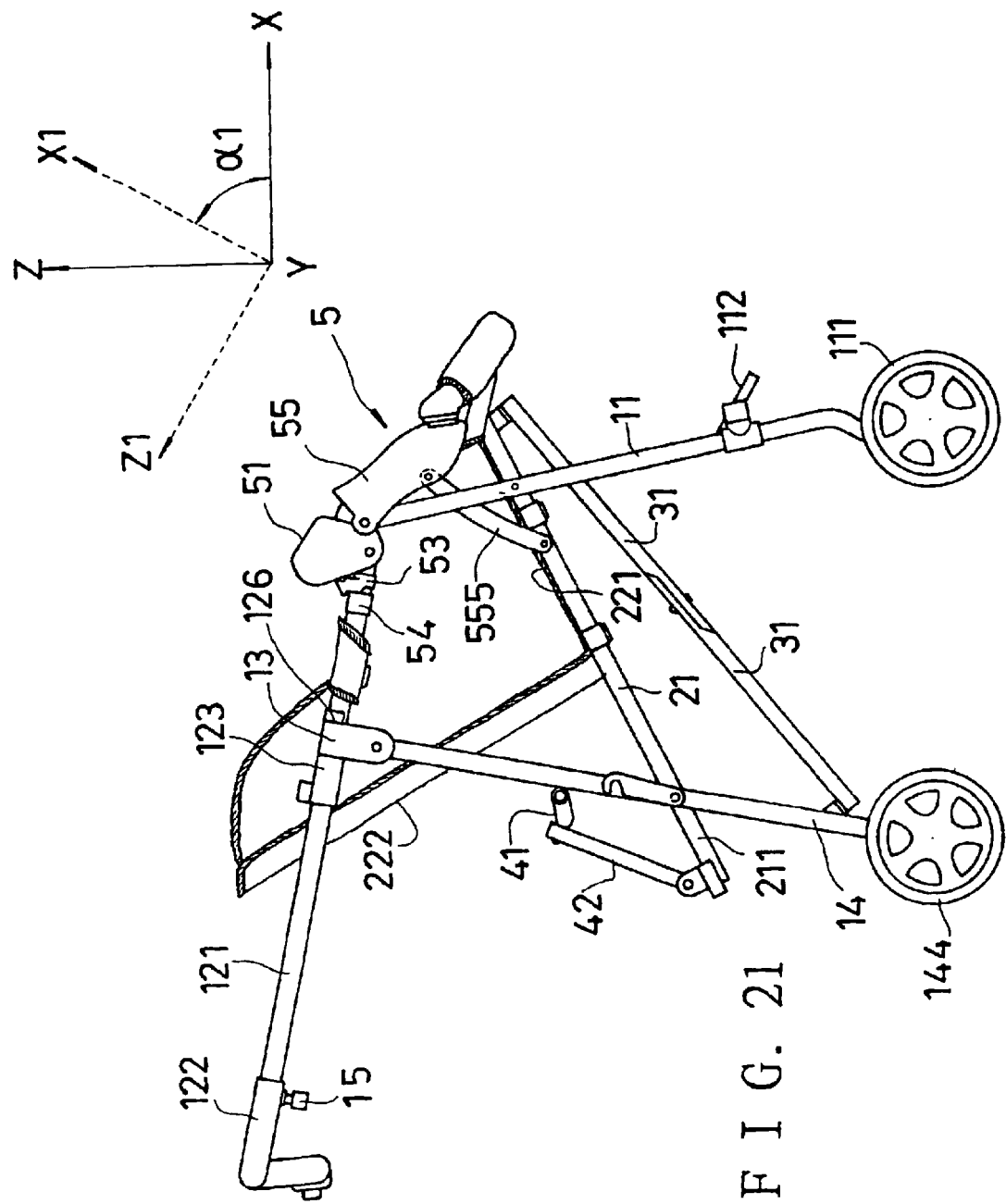
F I G. 21

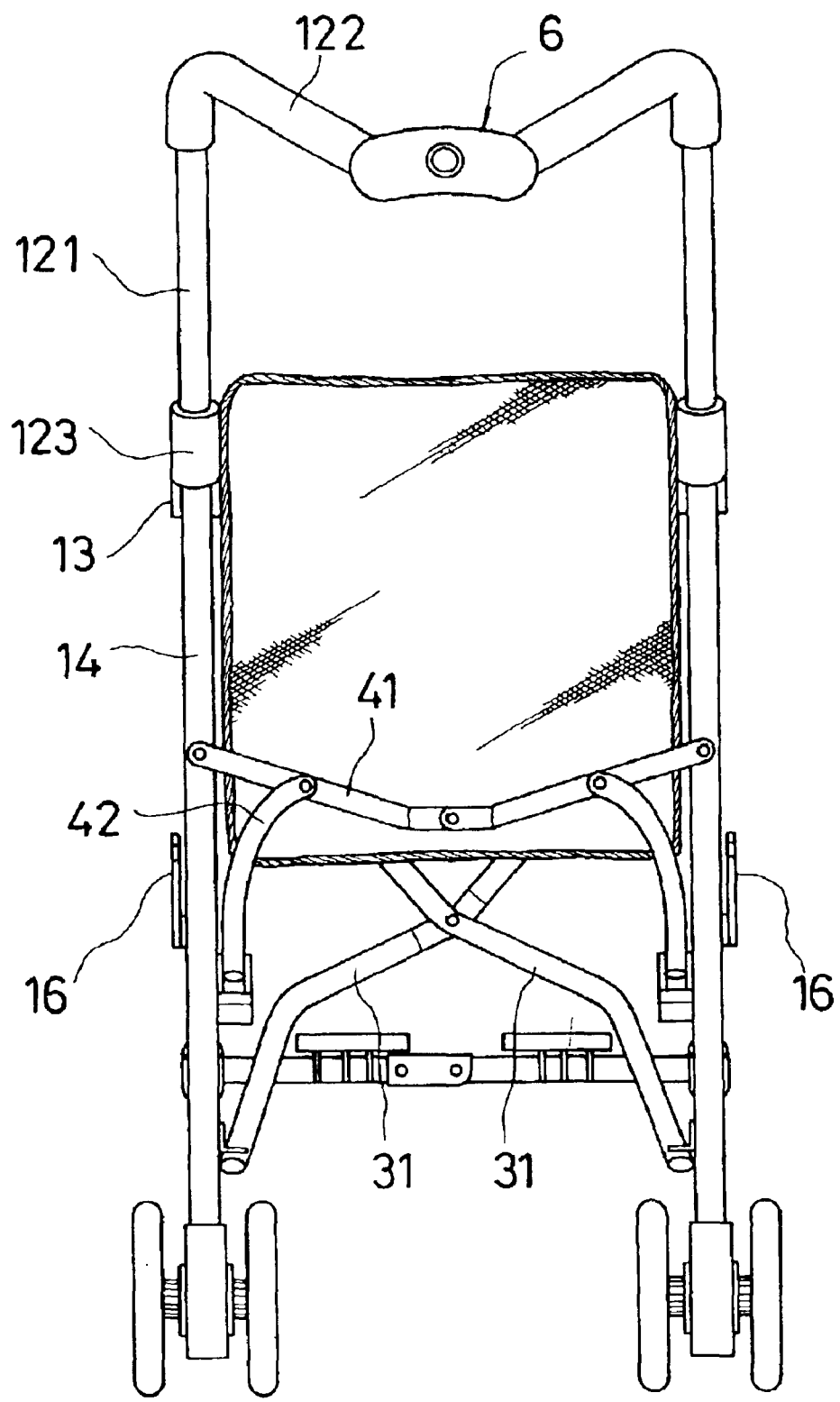
F I G. 22

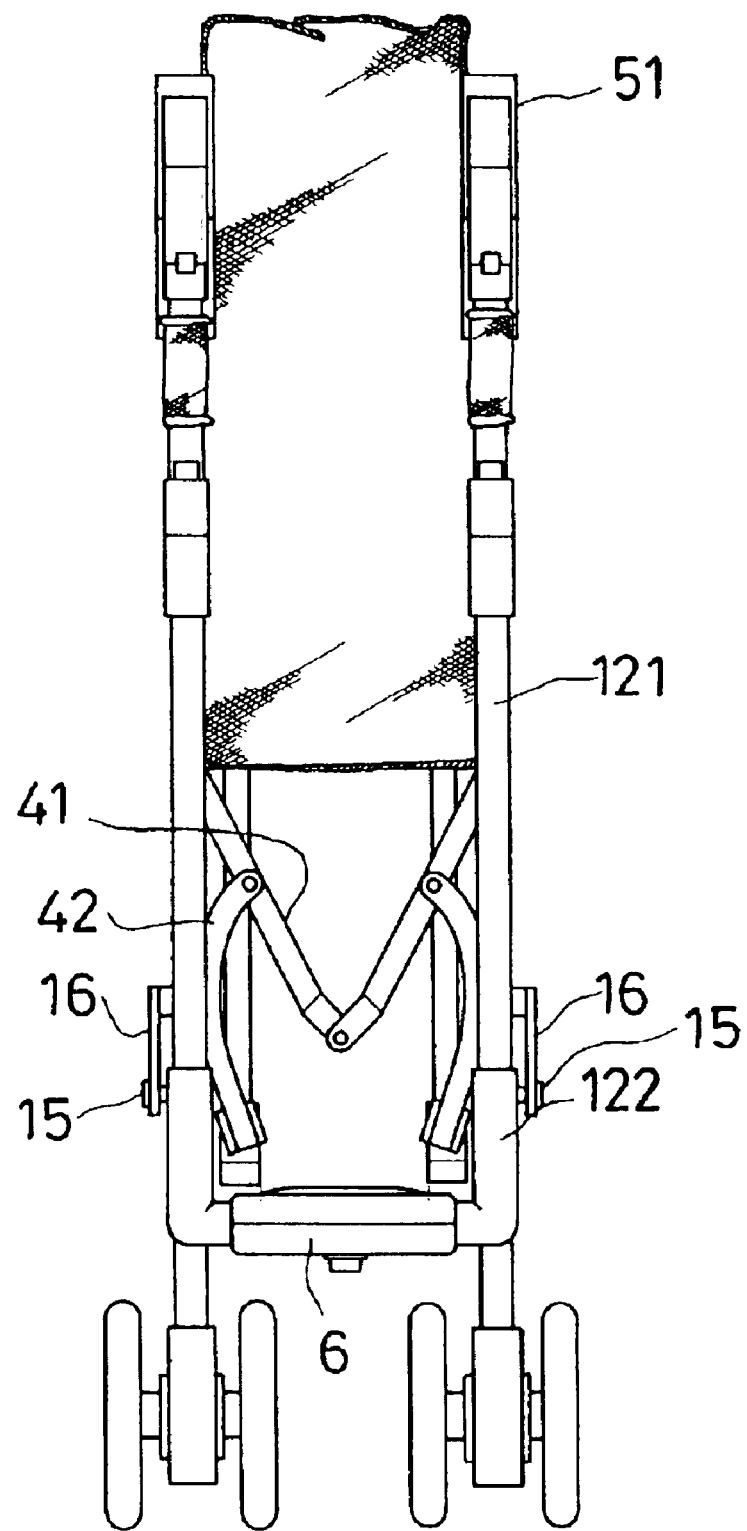
F I G. 26

FOLDABLE STROLLER

BACKGROUND OF THE INVENTION

The present invention relates to a foldable stroller, more particularly a foldable stroller, that can be collapsed in three dimensions to have a significantly reduced size for easy storage.

Referring to FIG. 1, a conventional foldable stroller has a front support member 10, a handle 20, a rear support member 30, front wheels 101, rear wheels 301, a seat 40, a pair of connecting rods 50, and a pair of operating rods 60. The rear wheels 301 are connected to the lower ends of the rear support member 30, while the front wheels 101 are disposed at the lower ends of the front support member 10. The rear support member 30 has extension portions at upper ends thereof, and is pivotally connected to the intermediate portions of the front support member 10. The seat 40 is disposed between the extension portions and the front support member 10. The handle 20 is connected to the upper ends of the front support member 10. The connecting rods 50 are pivotally connected to each other at middle portions, and are pivotally connected to the upper ends of the front support member 10 as well as the lower sections of the rear support member 30 at two ends thereof. The operating rods 60 are foldable at the middles, and are pivotally connected to the ends of the connecting rods 50 so that the stroller can be kept in the in-use position by stretching the operating rods 60.

To fold the stroller, the middles of both the operating rods 60 are pulled so that the parts of the support rods 10, 30 move closer, resulting in a reduction of the width of the stroller. However, the conventional stroller is found to have disadvantages as follows:

1. Each of the operating rods 60 has to be pulled because no co-moving element is provided to connect one of the rods 60 to the other, making the stroller relatively inconvenient to operate.
2. There is no locking element for locking the conventional stroller in the stretched in-use position. Therefore, the conventional stroller is prone to accidentally collapse and thereby hurt a baby seated thereon should an unintentional external force be exerted on the operating rods 60.
3. Only the width is reduced when the conventional stroller is folded, leaving the conventional stroller with a relatively large size after folding that will take up a lot of room in storage and transportation.
4. The conventional stroller is folded by causing the rods 60 and the connecting rods 50 to pivot on each other. Being pivotally connected to each other at the centers thereof, the rods 50 are likely to reduce the smoothness of the folding and the unfolding process.

Referring to FIG. 2, a pulling element 70 is connected to the middles of the operating rods 60 of the above conventional stroller at two ends; thus, the user only has to fold the upper one of the rods 60 in order to collapse the conventional stroller because the other operating rod 60 will be folded at the same time. However, the other disadvantages have yet to be overcome, namely, (1) a lack of locking elements for securing the conventional stroller in the unfolded position against unintentional folding; (2) an unsatisfactory reduction of size after folding; and, (3) a lack of smoothness of folding and unfolding due to the connecting rods 50.

SUMMARY OF THE INVENTION

It is a main object of the present invention to provide a foldable stroller, which can be folded in three dimensions so that it is relatively compact after folding.

It is another object of the present invention to provide a foldable stroller, which can be easily folded.

It is yet another object of the present invention to provide a foldable stroller, which has a locking means for preventing the foldable stroller from being inadvertently collapsed into the folded position.

BRIEF DESCRIPTION OF THE DRAWINGS

The present invention will be better understood by reference to the accompanying drawings, wherein:

FIG. 4 is a rear view of the foldable stroller of the present invention.

FIG. 19 is a rear view of the joining member of the handle of the present foldable stroller with the button depressed.

FIG. 20 is view of the front joining member under folding operation.

FIG. 21 is a side view of the present foldable stroller under folding operation.

FIG. 22 is a rear view of the present foldable stroller under folding operation.

FIG. 26 is a rear view of the present foldable stroller in the folded position.

DETAILED DESCRIPTION OF THE PREFERRED EMBODIMENTS

Figure 1:
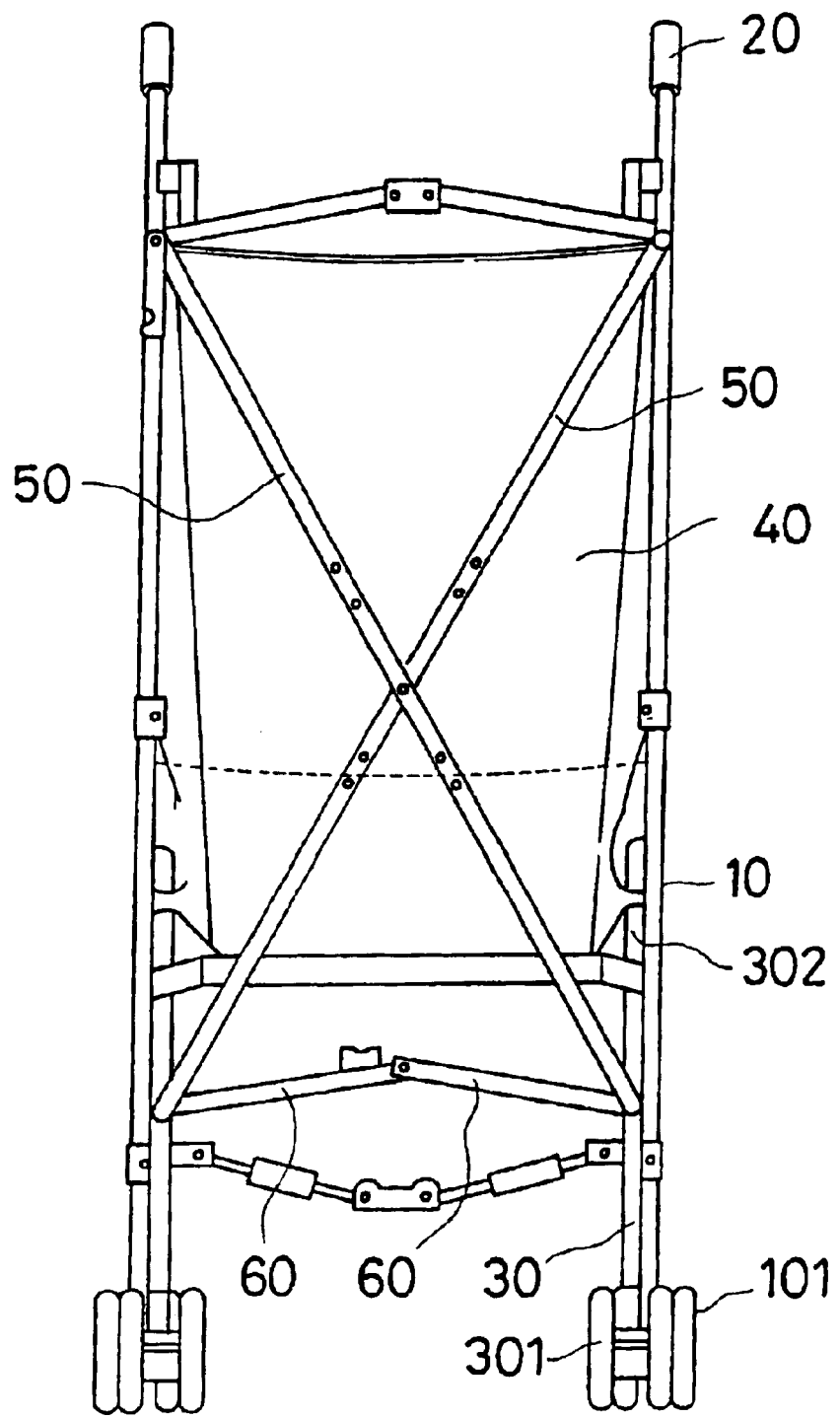
FIG. 1 is a view of the first conventional stroller in the Background.
Figure 2:
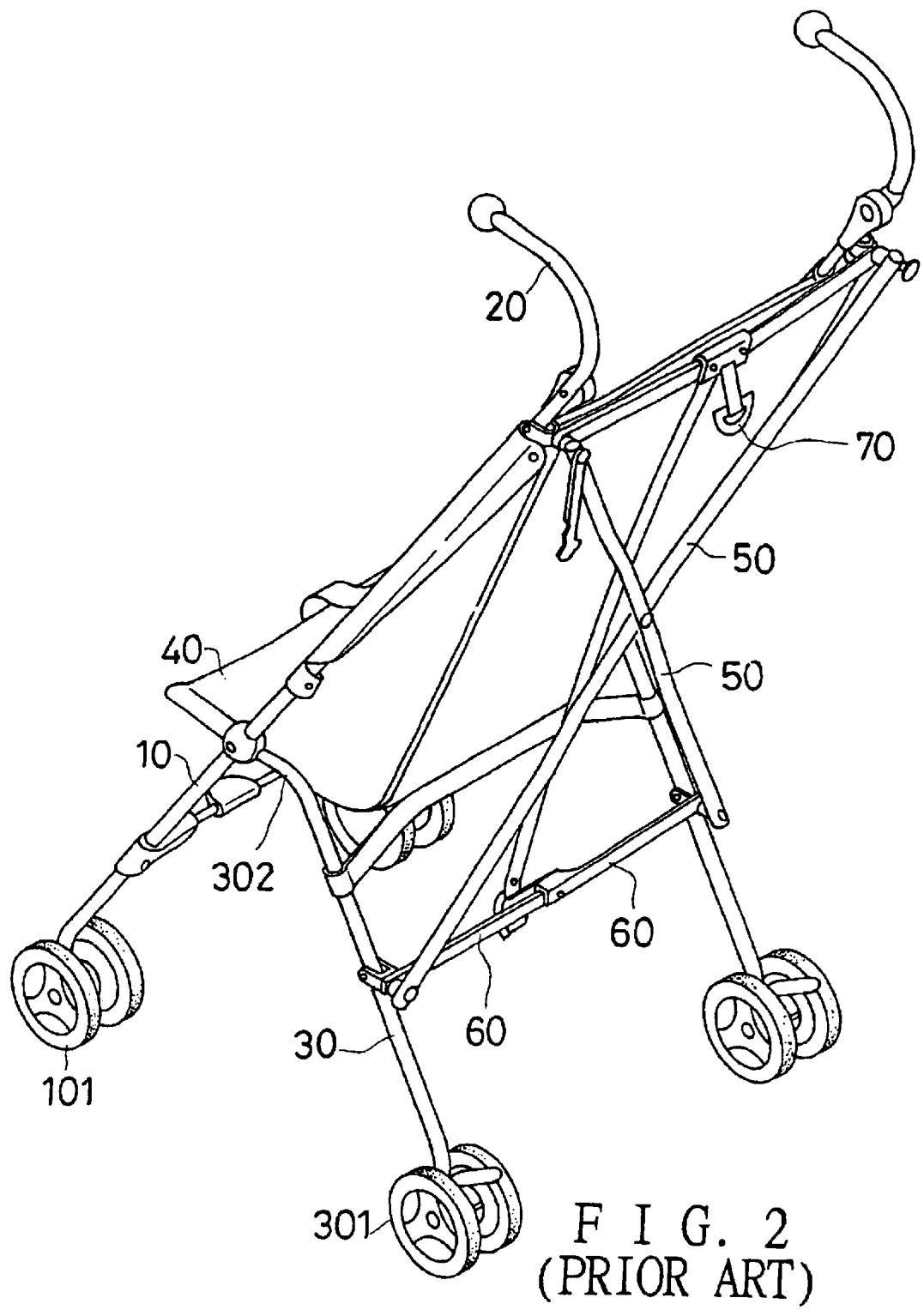
FIG. 2 is a perspective view of the second conventional stroller.
Figure 3:
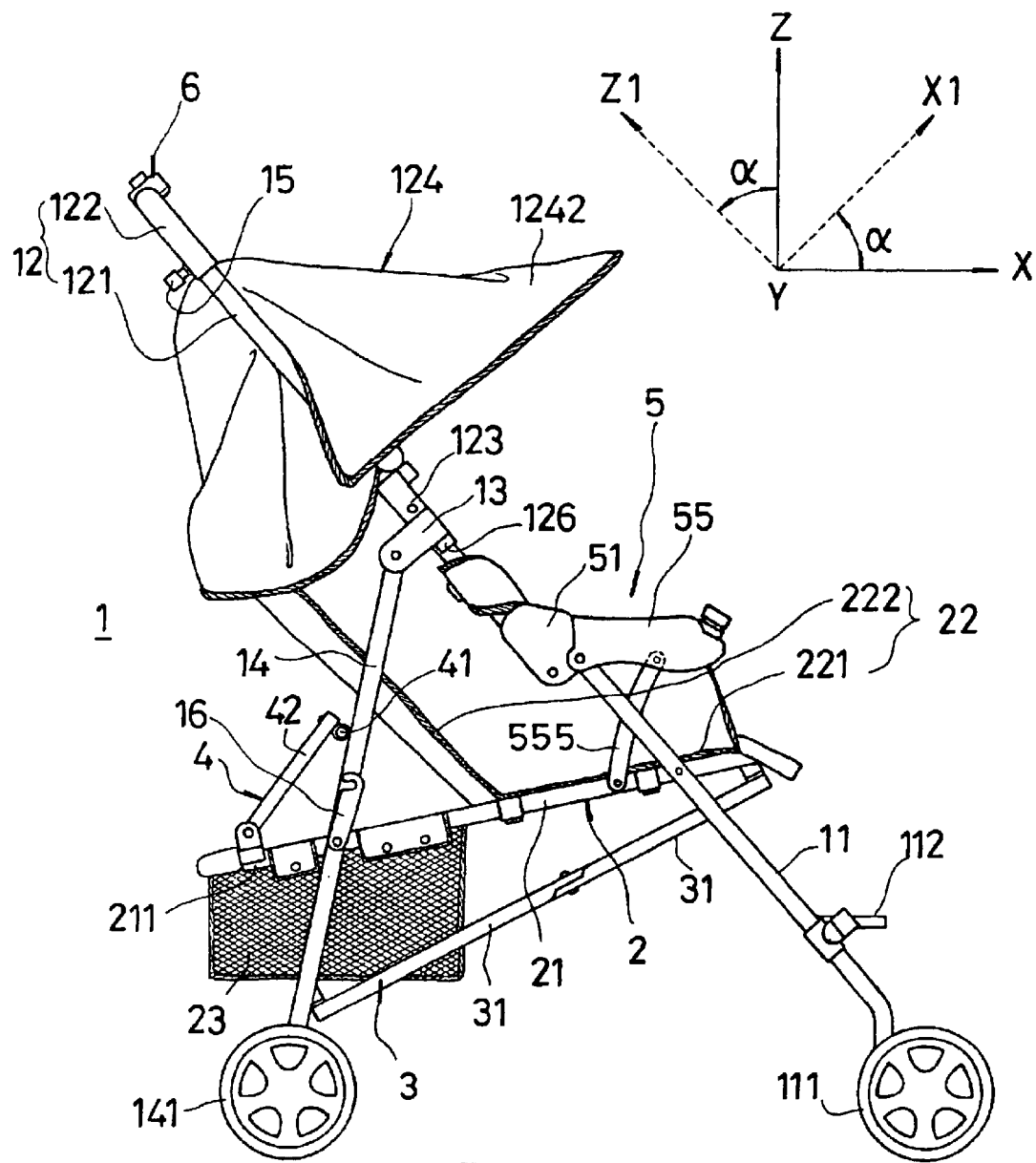
FIG. 3 is a side view of the foldable stroller of the present invention.
Figure 5:
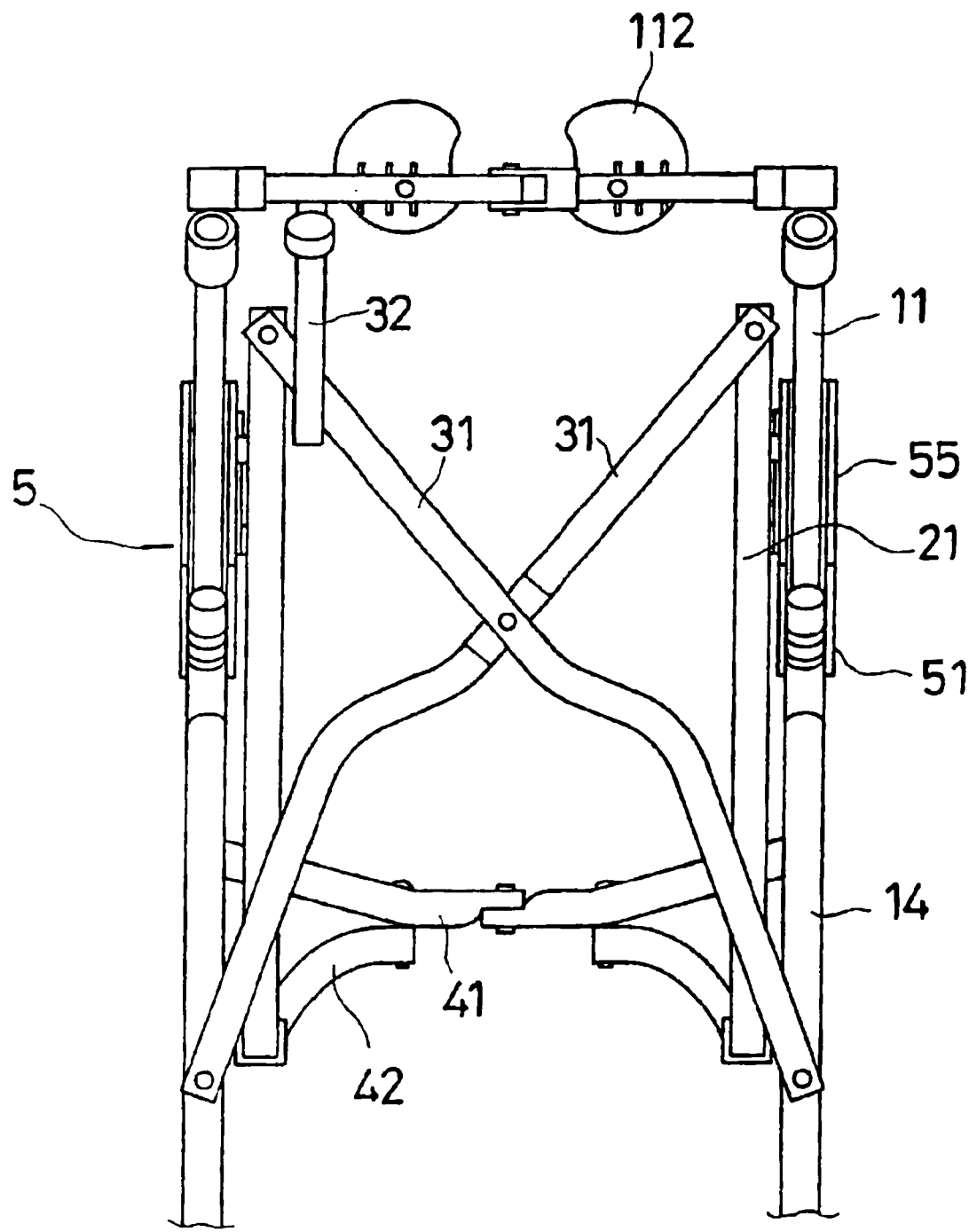
FIG. 5 is a bottom view of the foldable stroller of the present invention.
Figure 6:
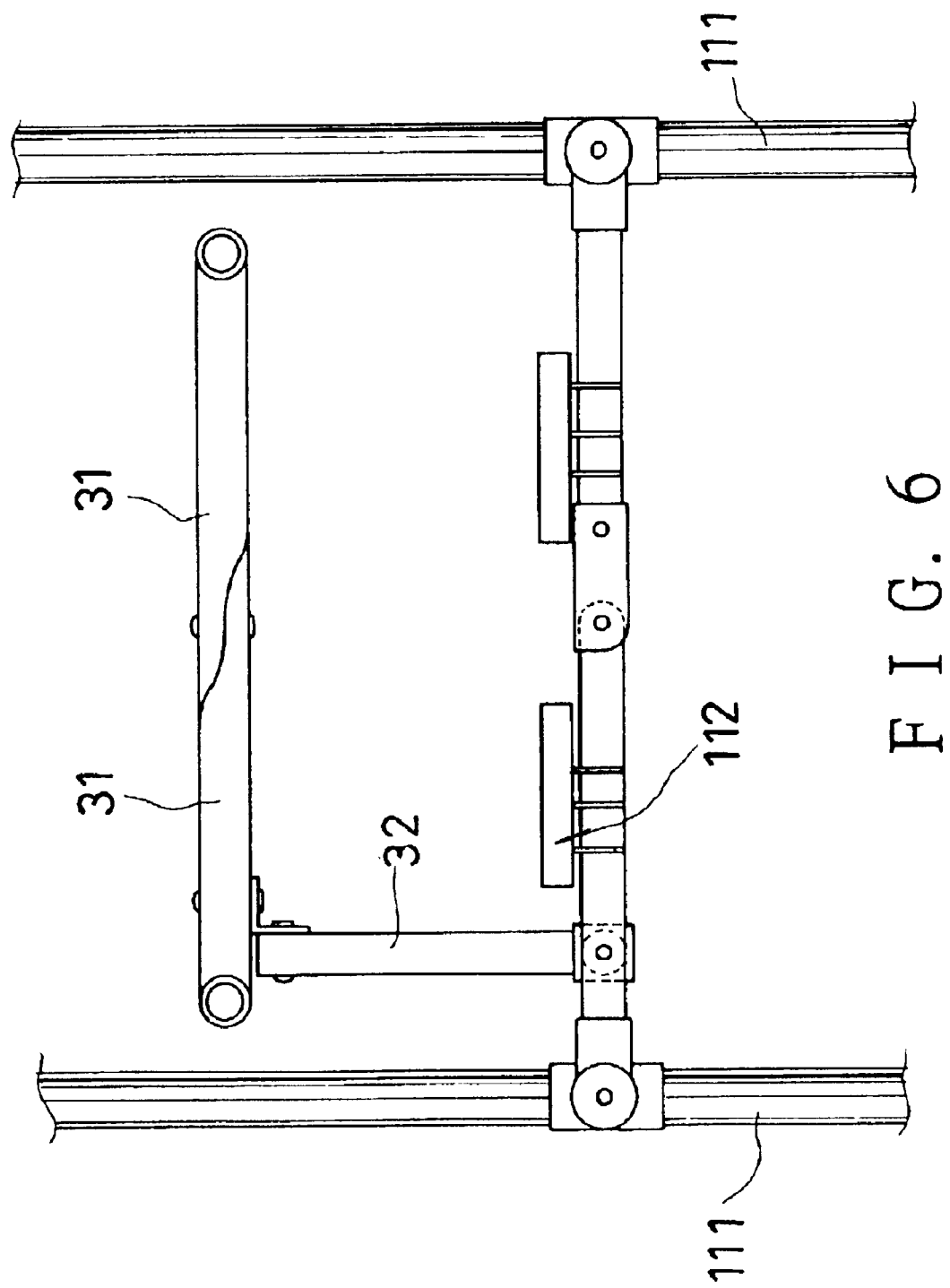
FIG. 6 is partial front view of the present foldable stroller.

Referring to FIGS. 3, 4 and 5, a stroller of the present invention includes a primary frame 1, a seating frame 2, an operating rod combination 3, and an auxiliary operating rod combination 4.

The primary frame 1 includes a front support member 11, a handle 12, a pair of first connecting members 13, a rear support member 14, and a pair of front joining members 5. The front, and the rear support members 11,14 each has two parallel rods. Front wheels 111 are fitted to lower ends of the front support member 11, while rear wheels 141 are fitted to lower ends of the rear support member 14.

Figure 7:
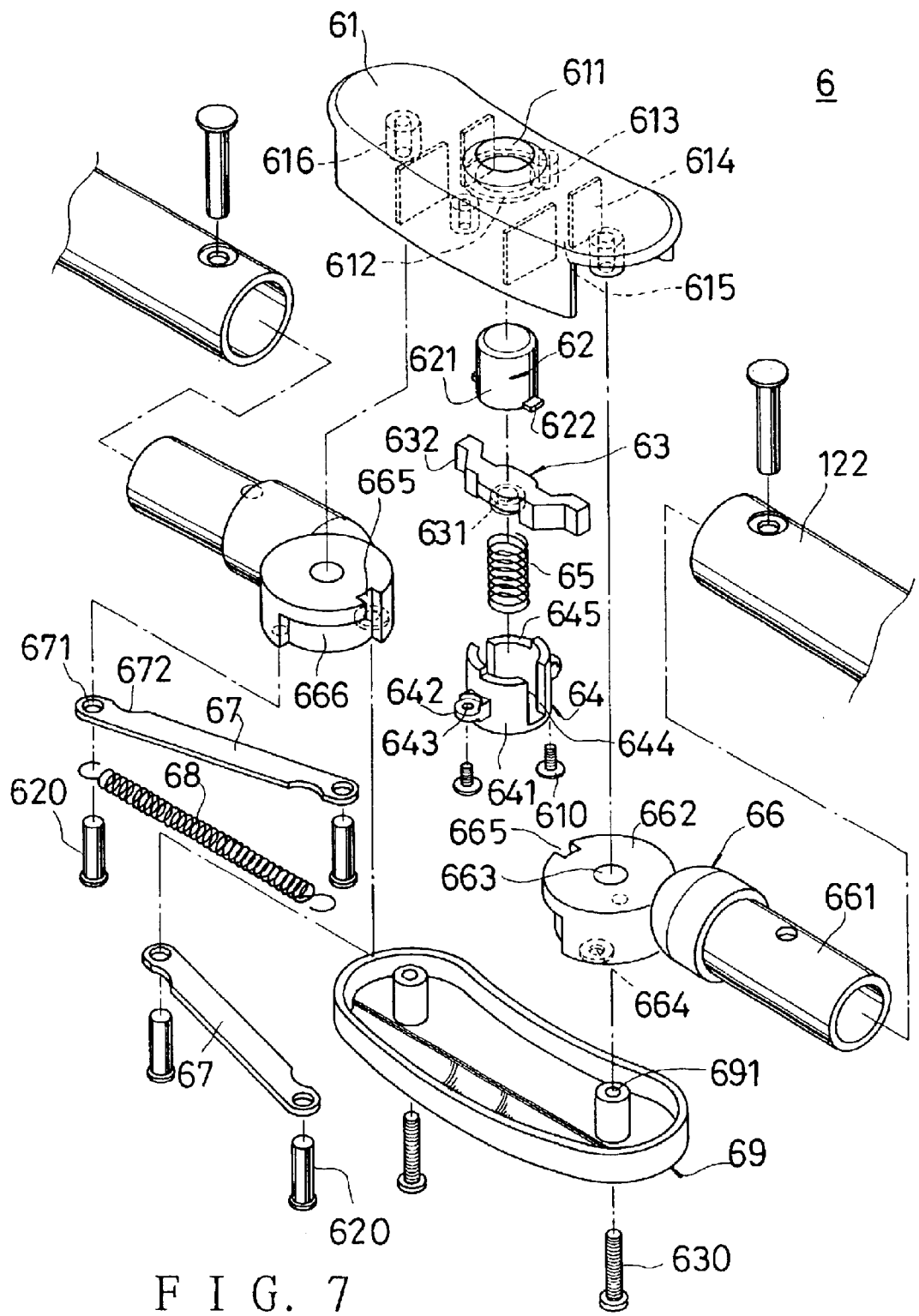
FIG. 7 is an exploded perspective view of the joining member of the handle of the present foldable stroller.

Referring to FIGS. 4 and 7, the handle 12 has two parallel lateral tubes 121, two bent tubes 122, and a joining member 6. The bent tubes 122 are connected to an upper end of a respective one of the lateral tubes 121 at a lower end. The bent tubes 122 are each fixedly connected to a joining part 66 at the other end; the joining parts 66 have insertion sections 661, which are inserted into the other ends of the bent tubes 122. The joining parts 66 have engaging members 662 at the opposite ends of the insertion sections 661. The engaging members 662 each has a central pivotal hole 663, a pair of connecting holes 664 at two opposite sides of the pivotal hole 663, an unlocking trench 665, and a stopping section 666.

Figure 10:
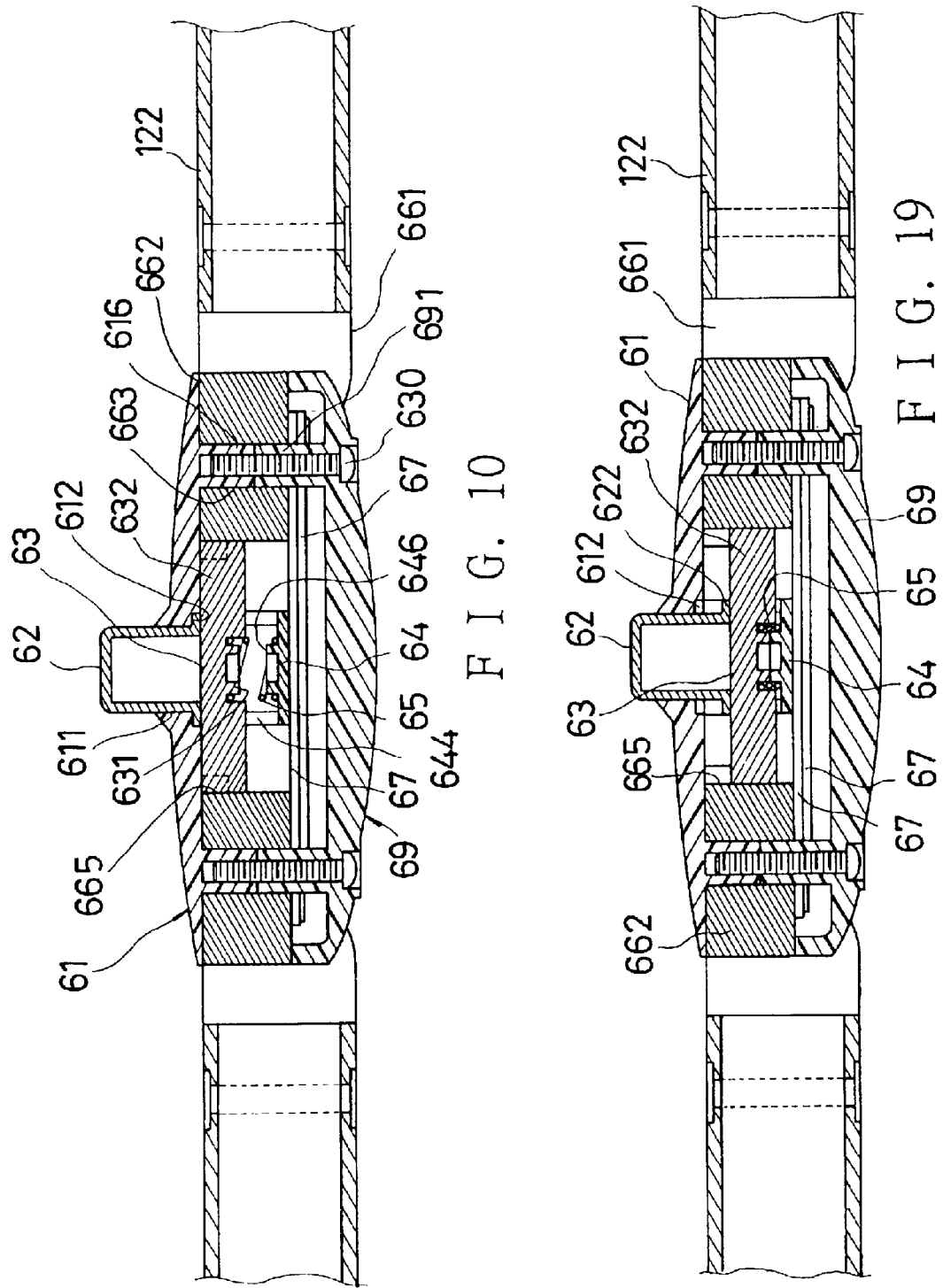
FIG. 10 is a rear view of the joining member of the handle of the present foldable stroller.

The joining member 6 includes an upper housing part 61, a lower housing part 69, a control button 62, a locking part 63, a control base 64, a spring 65, two co-moving plates 67, and a pulling spring 68. The upper housing part 61 has a holding hole 611, a pair of holed connecting poles 616, a pair of holed connecting poles 613, two pairs of stopping walls 614, and a recess 612 (FIG. 10) around the lower end of the holding hole 611; the holes of the poles 613, 616 have threads therein; stopping walls 614 of each pairs have a gap 615 in between; holed poles 691 are formed on the upper side of the lower housing part 69, corresponding to the poles 616. The button 62 has engaging projections 622 sticking sideways in opposite directions, and is movably passed through the holding hole 611 with the engaging projections 622 reversibly fitting into the recess 612. The locking part 63 has two engaging ends 632, and a locating protrusion 631 on a center of the bottom. The locking part 63 is disposed under the button 62. The control base 64 has two opposing elongated gaps 644 between annular walls 641 thereof; the control base 64 is fixed to the bottom of the upper housing part 61 by means of screwing bolts 610 into holed lateral connecting ears 642 as well as the holed poles 613 of the upper housing part 61; the engaging ends 632 of the locking part 63 protrude from the elongated gaps 644; the upper end of the spring 65 is fitted around the locating protrusion 631 of the locking part 63, and the lower end of the spring 65 is fitted around a locating protrusion 646 (FIG. 10) of the control base 64 so that the locking part 63 is biased up to an upper end of the control base 64. The annular walls 641 each has a recessed portion 645 on the top; the engaging projections 622 of the button 62 are stopped with the recessed portions 645 when the button is in a locked position, therefore the button 62 can't be moved down or turned. When the engaging projections 622 are moved to face the top openings of the elongated gaps 644, the button 62 is in an unlocked position and can be depressed to move the locking part 63 down to a lower end of the control base 64.

The unlocking trenches 665 of the engaging members 662 of the joining member 6 have upper sections, and lower sections longer than the upper sections; the engaging ends 632 of the locking part 63 are received in the upper sections of the unlocking trenches 665 to engage the engaging members 662 when positioned in the upper end of the control base 64; the engaging ends 632 of the locking part 63 are received in the lower sections of the unlocking trenches 665 for allowing the bent tubes 122 of the handle 12 to be pivoted on the joining member 6 when positioned in the lower end of the control base 64; thus the bent tubes 122 can be pivoted on the joining member 6 by depressing the button 62 after the button 62 has been turned to the unlocked position.

Figure 11:
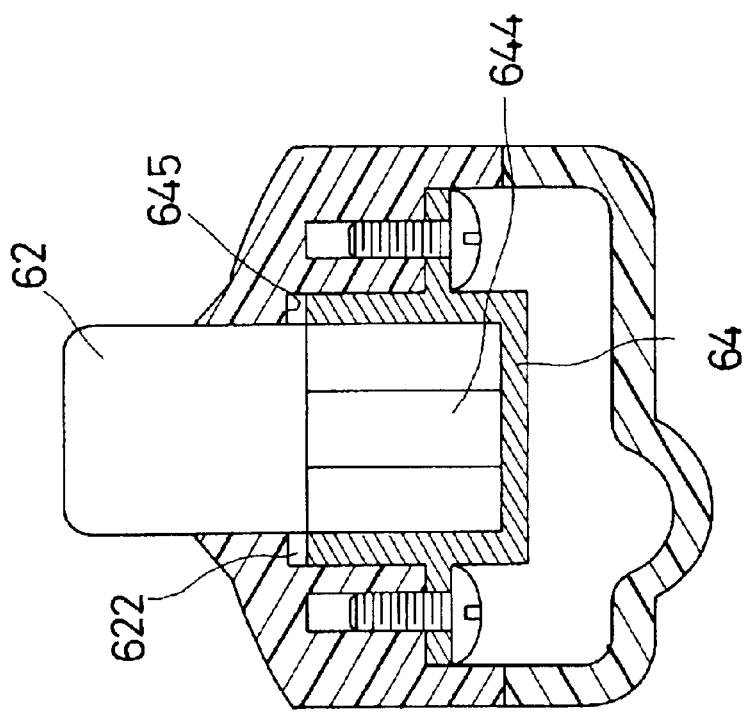
FIG. 11 is a partial side view of the joining member of the handle of the present foldable stroller.
Figure 17:
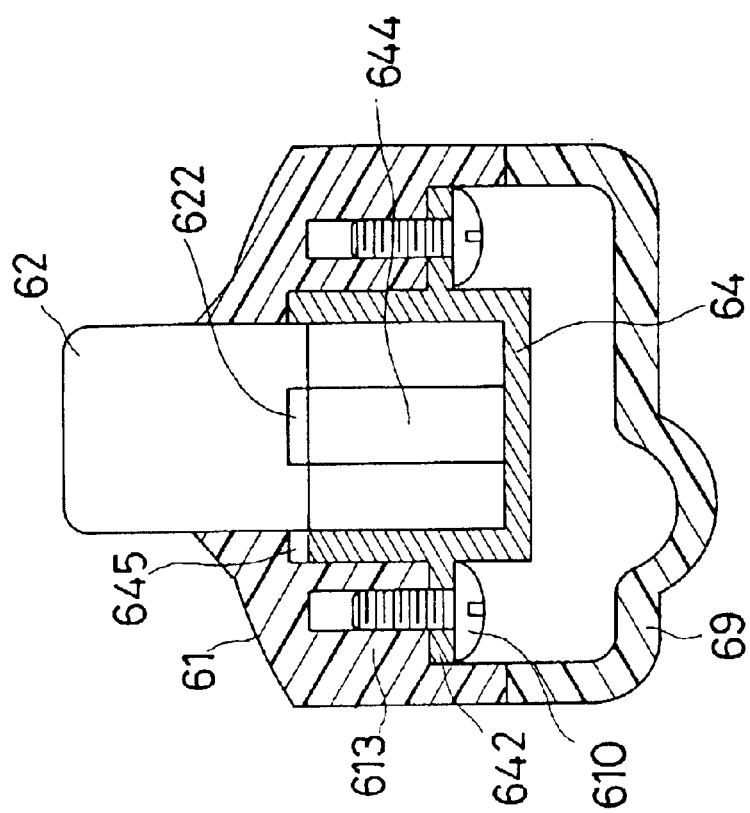
FIG. 17 is a side view of the present foldable stroller with the button rotated.
Figure 18:
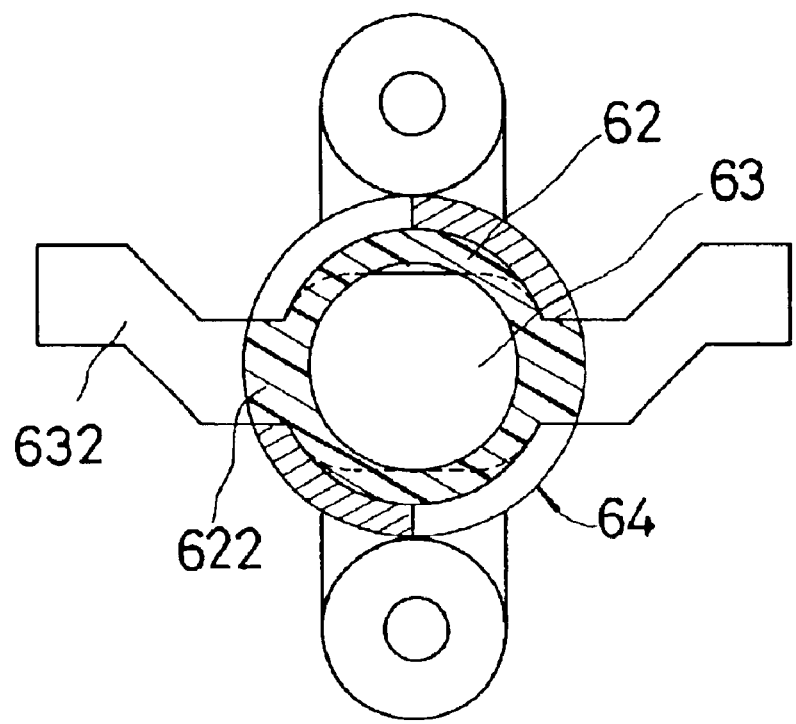
FIG. 18 is a top view of the present foldable stroller with the button rotated.
Figure 13:
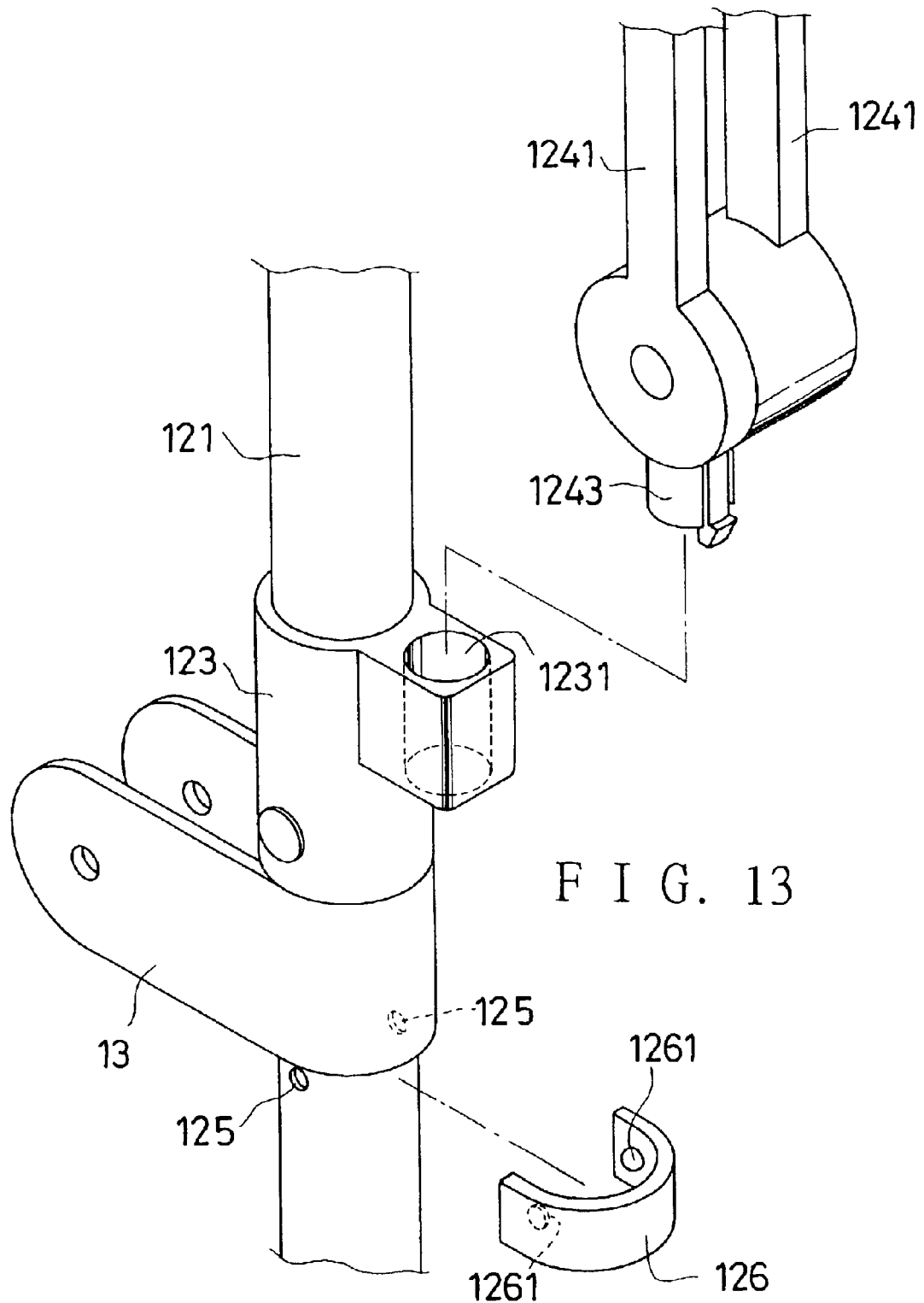
FIG. 13 is an exploded perspective view of the joints of the front support member and the canopy support of the present foldable stroller.

The first connecting members 13 are disposed at the lateral tubes 121 of the handle 12. Referring to FIG. 11, the first connecting members 13 are each provided with a connecting tube 13 at upper end, and an engaging member 126 at lower end; the connecting tubes 123 (FIG. 13) have connecting extension portions 1231 for insertion sections 1243 of lower ends of a canopy support frame 1241 (FIG. 3) to be connected thereto. Referring to FIGS. 3 and 11, the canopy 124 includes a shade 1242, and the canopy support frame 1241, of which the lower end insertion sections 1243 are inserted into the connecting extension portions 1231 of the connecting tubes 123. The canopy frame 1241 has two flexible rod parts formed with a U-shape and that are pivotally connected to each other at two ends. The engaging members 126 have opposing engaging protrusions 1261 on inner sides, and are affixed to the lateral tubes 121 of the handle 12 with the protrusions 1261 being fitted into engaging holes 125 of the lateral tubes 121. The upper ends of the rods of the rear support member 14 are pivotally connected to the first connecting members 13.

Figure 14:
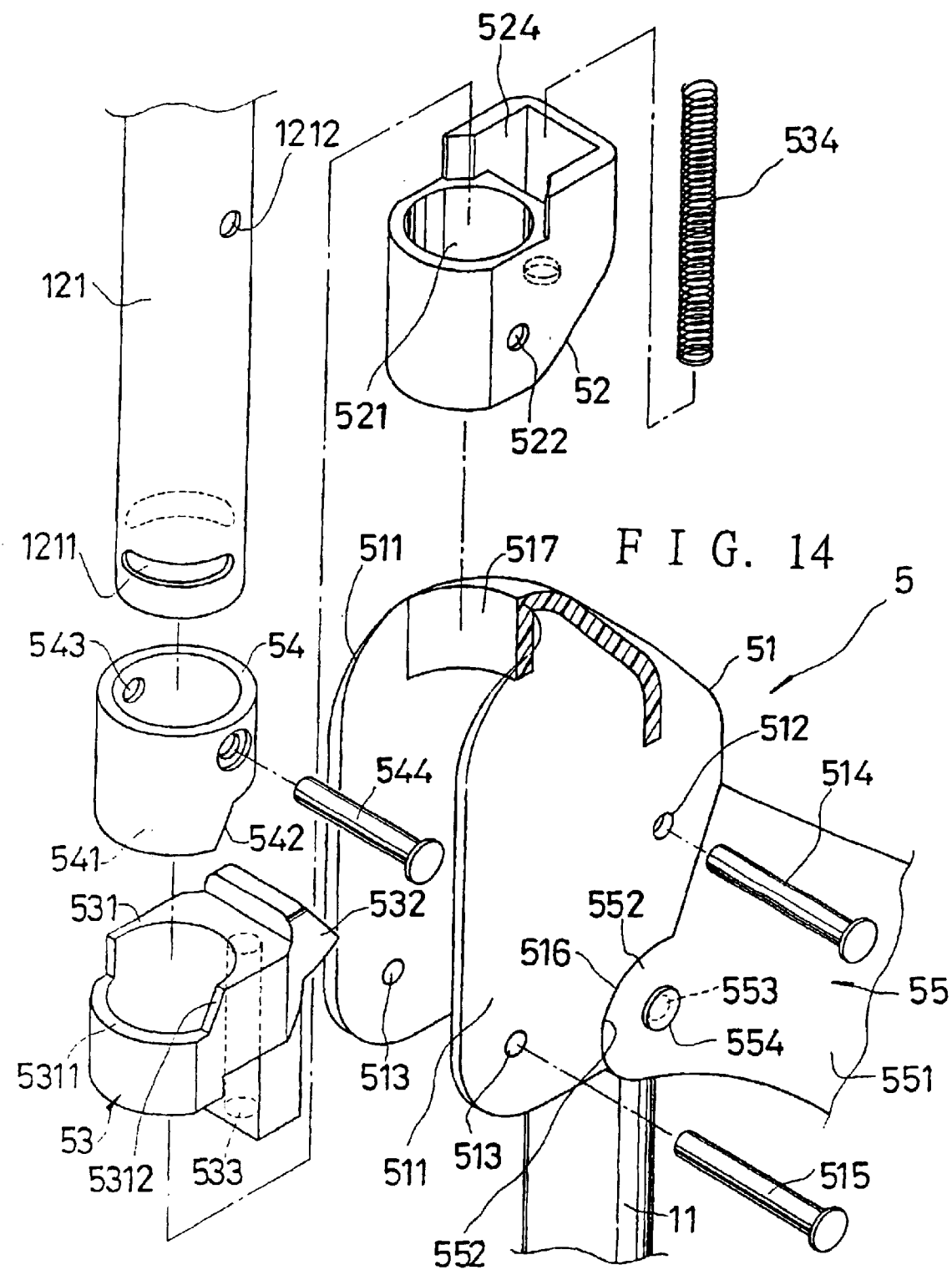
FIG. 14 is an exploded perspective view of the front joining member of the present stroller.
Figure 15:
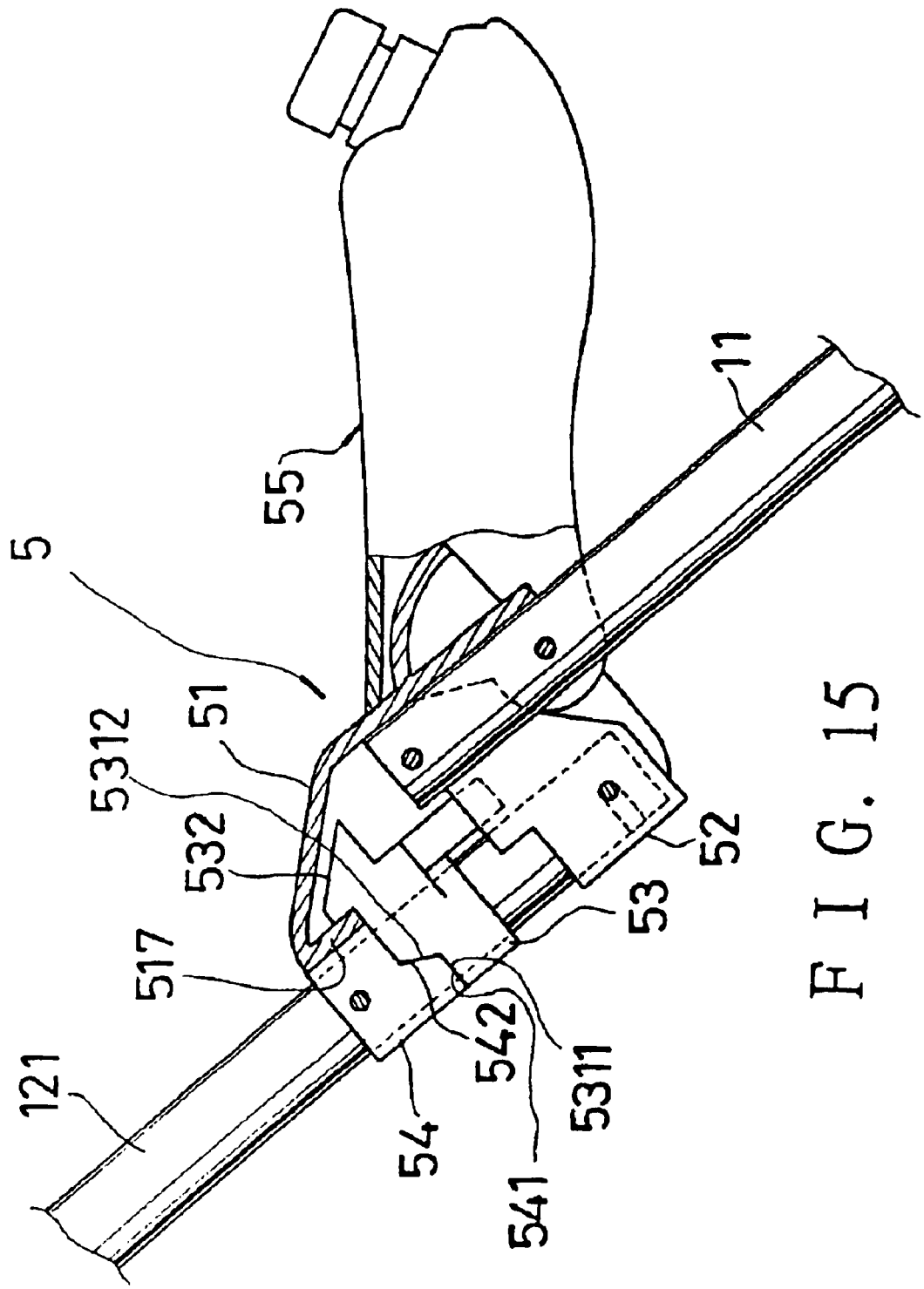
FIG. 15 is a side view of the front joining member of the present foldable stroller.
Figure 16:
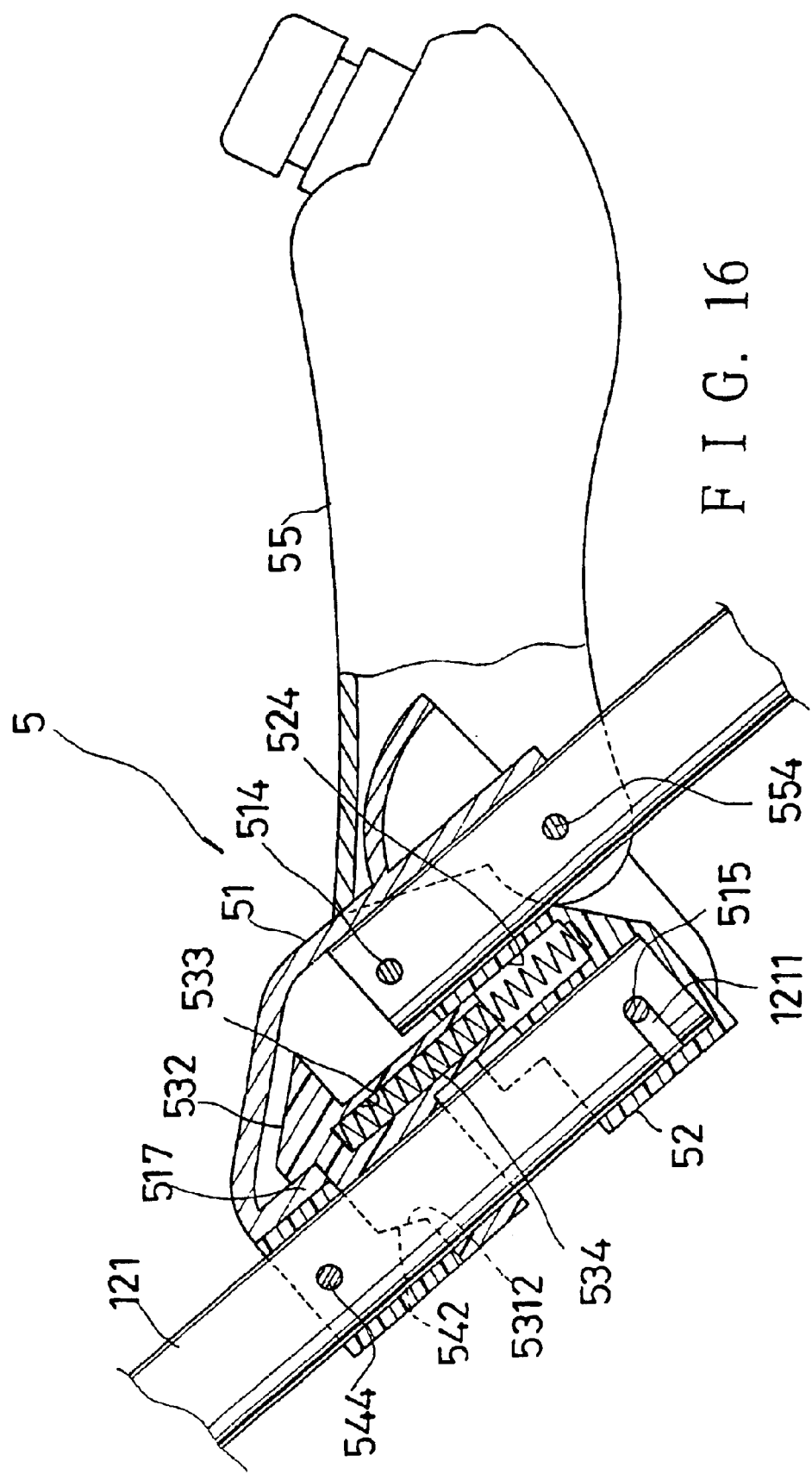
FIG. 16 is another side view of the front joining member of the present foldable stroller.
Figure 23:
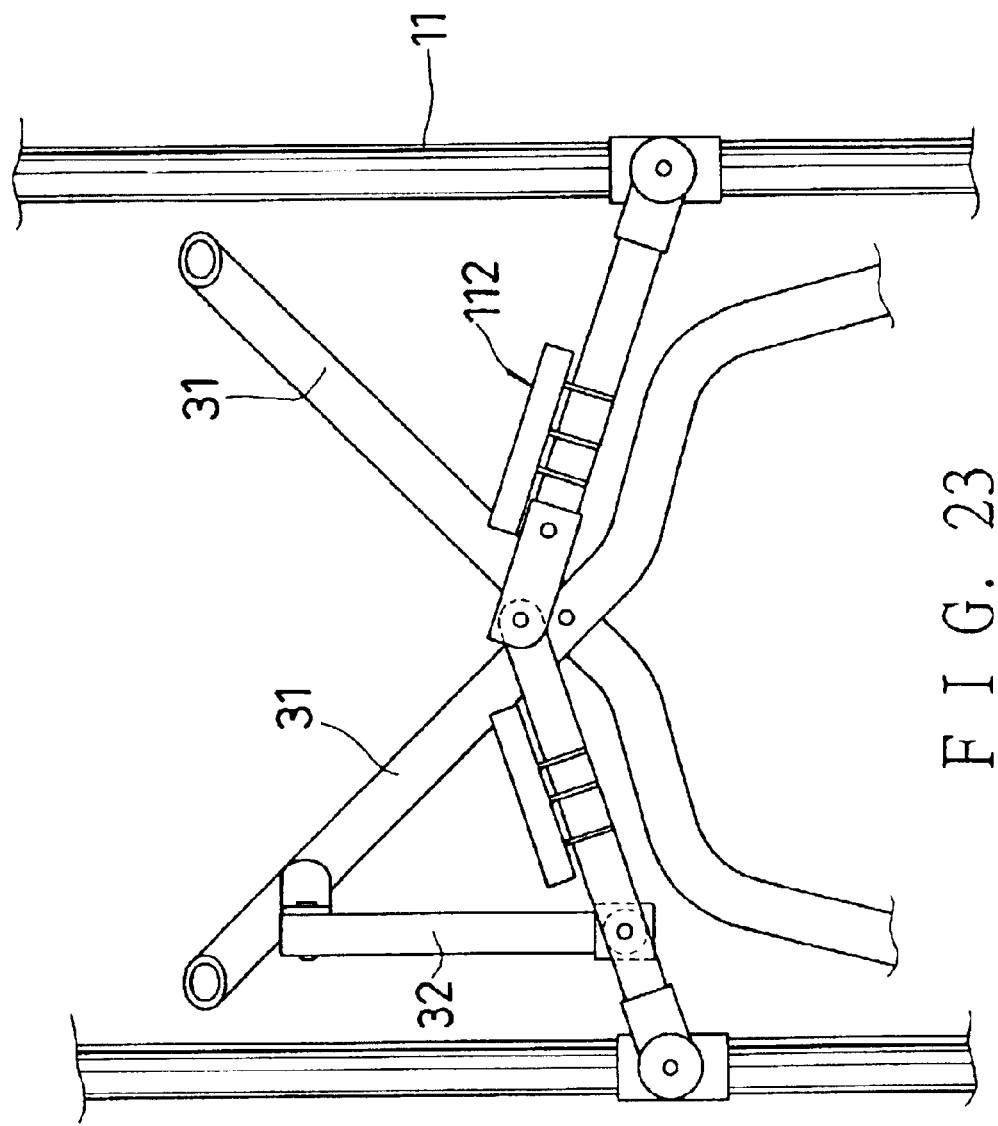
FIG. 23 is a view of the footrest and the operating rod combination under folding operation.
Figure 24:
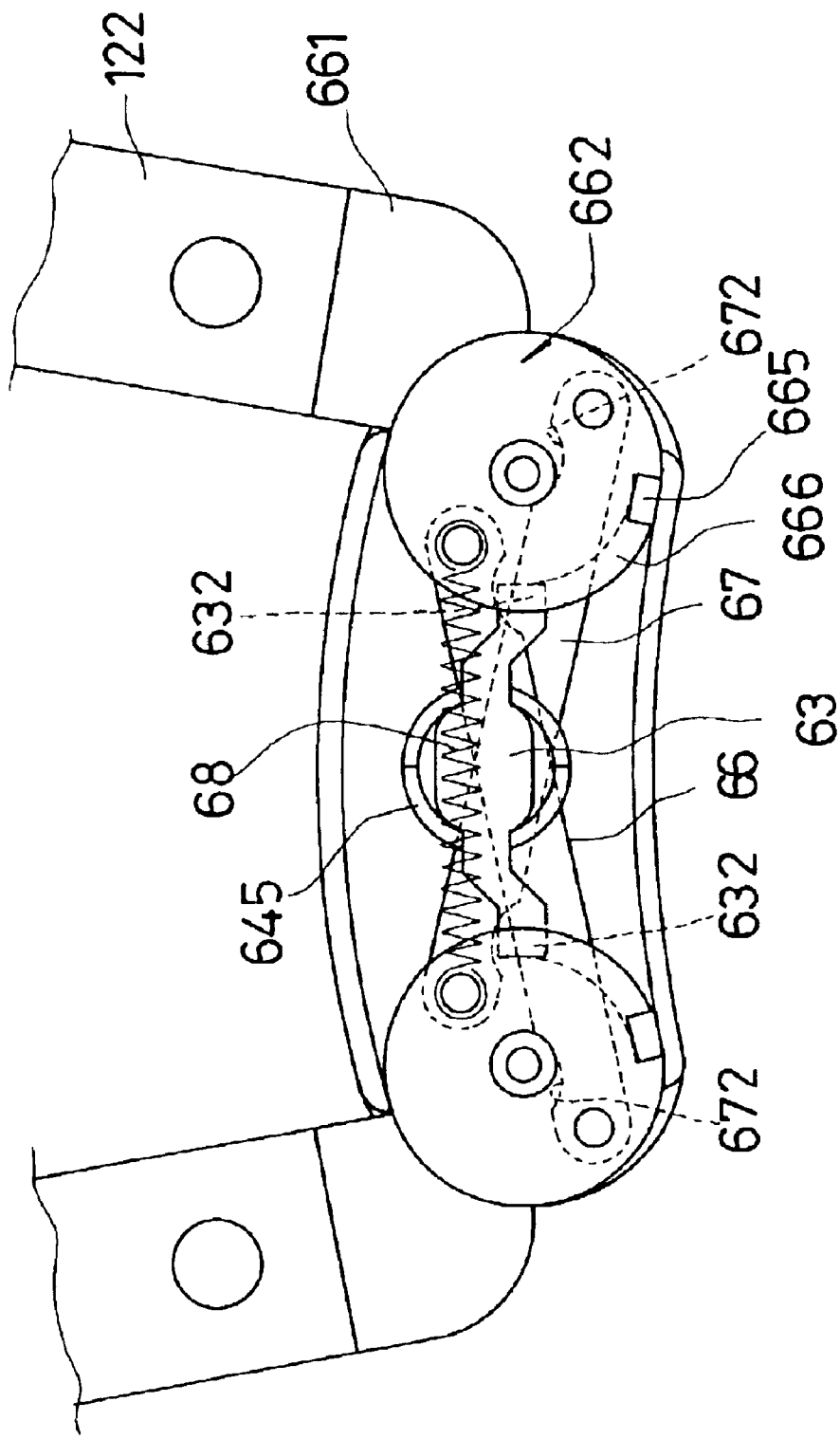
FIG. 24 is a top view of the joining member in the folded position.
Figure 25:
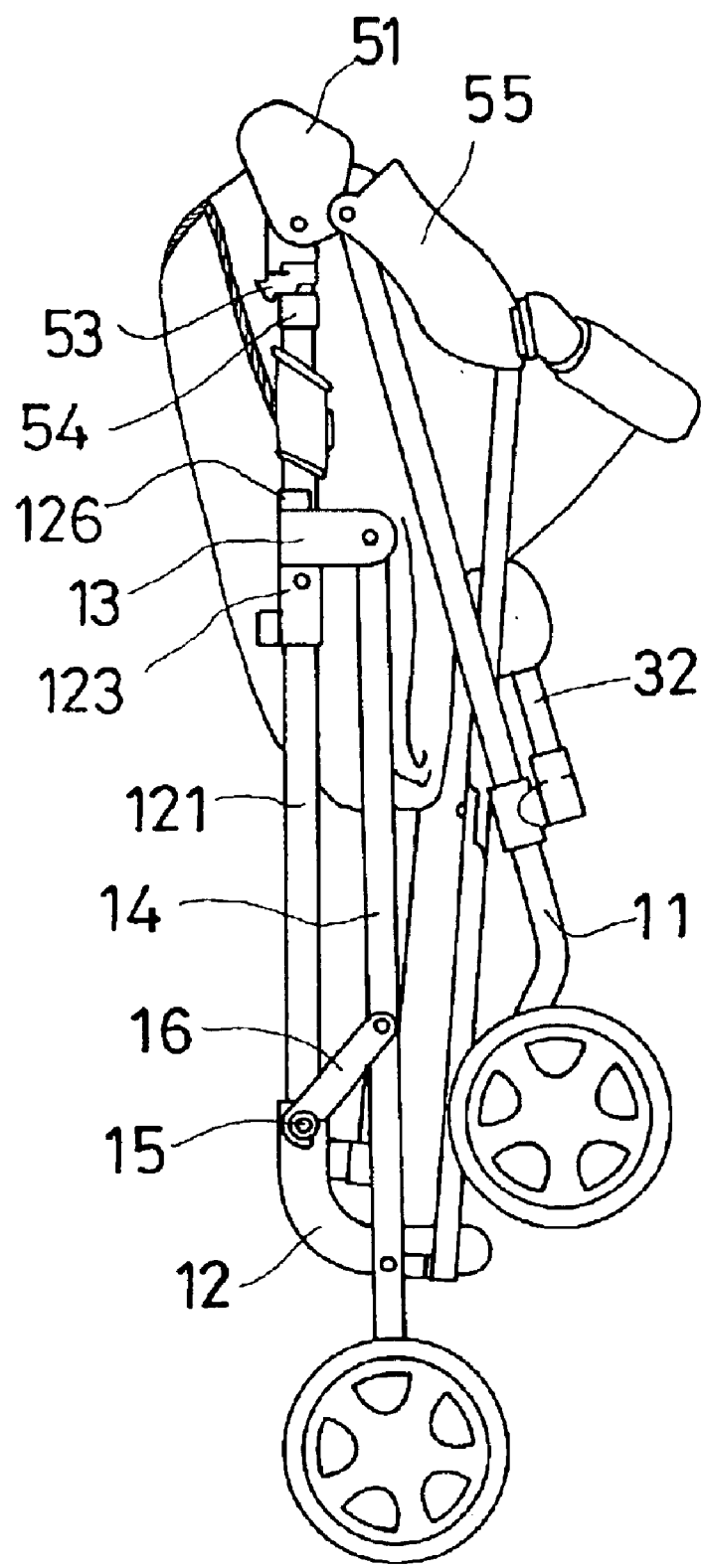
FIG. 25 is a side view of the present foldable stroller in the folded position.
Figure 27:
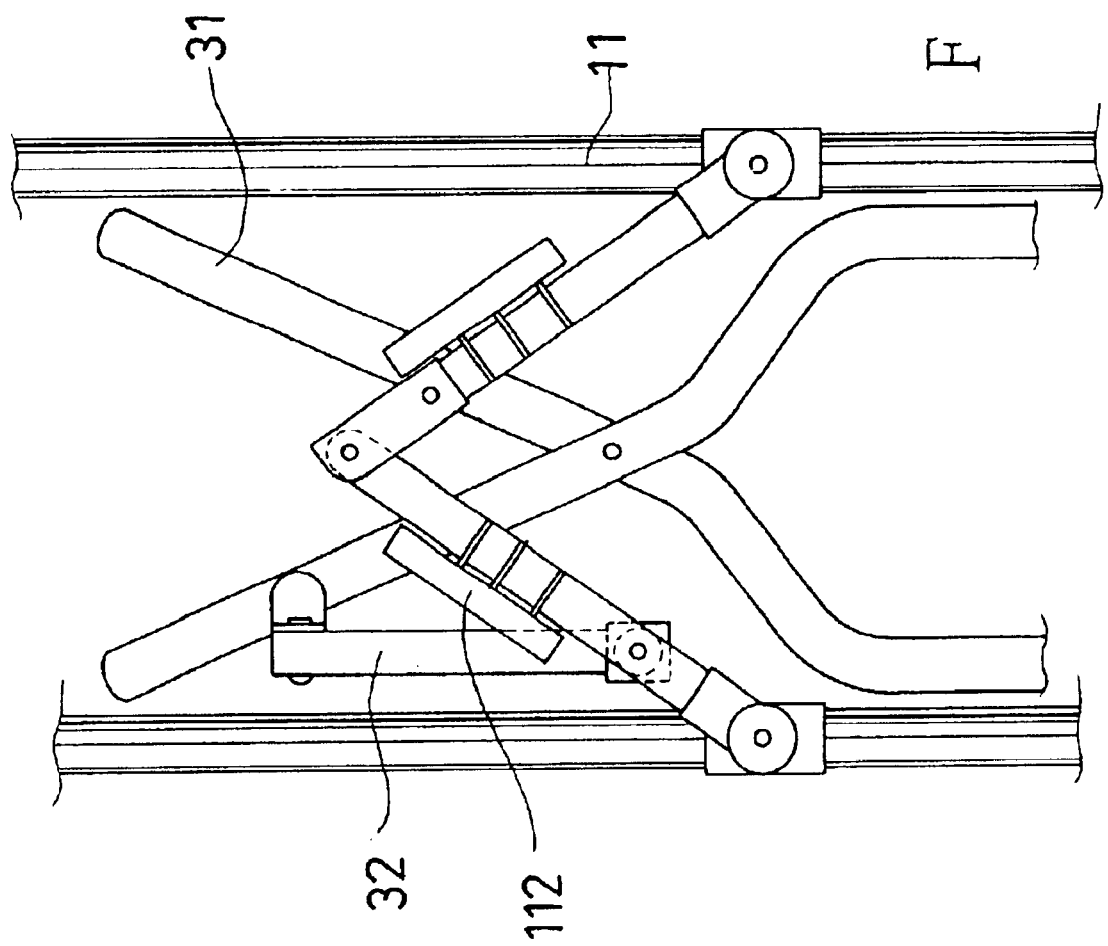
FIG. 27 is a partial front view of the present foldable stroller in the folded position.

Referring to FIG. 14, the front joining members 5 each has a connecting part 51, and a locking combination. The connecting parts 51 each has a hooking protrusions 517, and two lateral walls 511, which are formed with through holes 513, 512, and concavely curved edges 516. The upper ends of the front support member 11 are connected to a respective one of the connecting parts 51 by means of fixing elements 514 passed through the holes 512 and holes of the front member 11. The locking combinations each includes a pushing block 54, an engaging block 53, and a fixed block 52; the pushing blocks 54 are fitted around the lateral tubes 121 of the handle 12; referring to FIGS. 15 and 16, the pushing blocks 54 have lower extension portions 541 having sloping edges 542, and through holes 543; fixing elements 544 are passed through the holes 543 and holes 1212 of the lateral tubes 121 to secured the pushing blocks 54 to the tubes 121; the engaging blocks 53 are movably fitted around the lateral tubes 121 under the pushing blocks 54 at tube-shaped portions 531 thereof, and have upper recessed portions 5311 having sloping edges 5312 on the tube-shaped portions 531; the engaging blocks 53 have up-sticking hooking portions 532 to separably engage down-sticking hooking protrusions 517 of the connecting parts 51; the engaging blocks 53 have holding cavities 533, in which elastic members 534 are received with lower ends sticking out from the cavities 533. Each of the fixed blocks 52 has a connecting tube 521, holes 522, and a holding cavity 524; the fixed blocks 52 are pivotally connected to the connecting parts 51, and are connected to lateral curved slots 1211 of the lower ends of the lateral tubes 121 by means of shafts 515 passed through the holes 513, the slots 1211, and the holes 522; the lower ends of the elastic members 534 are held in the holding cavities 524 of the fixed blocks 52 so that the engaging blocks 53 are biased up with the members 534. Therefore the engaging blocks 53 usually engage the hooking protrusions 517 of the connecting parts 51 to prevent the lateral tubes 121 of the handle 12 from moving relative to the connecting parts 51 when the stroller is being used. The sloping edges 542 of the pushing blocks 54 abut the sloping edges 5312 of the engaging blocks 53 so that the pushing blocks 54 can depress the engaging blocks 53 for the hooking portions 532 of the engaging blocks 53 to disengage the hooking protrusions 517 of the connecting parts 51 when the lateral tubes 121 are turned about the central axes thereof in folding the handle 12, allowing the lateral tubes 121 to be pivoted on the connecting parts 51.

The seating frame 2 is shaped to support a seat 221, and a back 222, both of which are provided with separate narrow boards to be collapsable into smaller size; the seating frame 2 is pivotally connected to intermediate portions of the front support member 11 at front portions of elongated rods 21 thereof; the seating frame 2 has branch extension sections 211 extending from the elongated rods 21 and beyond the rear support member 14; the branch sections 211 are pivotally connected to the intermediate portions of the rear support member 14. A basket 23 is hung on the branch extension sections 211; the basket 23 has a flexible frame so that it will hinder folding of the stroller.

Referring to FIGS. 4, 6, 17 and 18, the operating rod combination 3 has a pair of first connecting rods 31, and a co-moving rod 32; the connecting rods 31 are pivotally connected to each other at intermediate portions thereof; the front, and the rear ends of the connecting rods 31 are pivotally connected to front ends of the seating frame 2, and lower ends of the rear support member 14 respectively. Two ends of the co-moving rod 32 are connected to one of the first connecting rods 31, and pivotally connected to a foldable footrest 112 respectively; the footrest 112 is disposed at lower portions of the front support member 11, and can be adjusted in position.

Referring to FIG. 4, the auxiliary operating rod combination 4 a pair of second connecting rods 41, and a pair of curved rods 42; the second connecting rods 41 are pivotally connected to each other at inner ends thereof, and are pivotally connected to a respective one of the rods of the rear support member 14 at outer ends; the curved rods 42 are pivotally connected to intermediate portions of the second connecting rods 41 at the first ends, and are pivotally connected to the branch extension sections 211 of the seating frame 2 at the other ends.

Referring to FIGS. 17–23, to fold the stroller, the button 62 is turned to the unlocked position, and depressed so that engaging ends 632 of the locking part 63 are moved to the longer lower sections of the unlocking trenches 665 to disengage the engaging members 662, allowing the bent tubes 122 to be pivotally connected with the joining member 6 together with the joining parts 66. Thus, the lateral tubes 121 are moved close to each other, and turn about the central axes thereof relative to the engaging blocks 53 of the front joining members 5; the engaging blocks 53 are pressed down with the sloping edges 542 of the pushing blocks 54, which are turned together with the lateral tubes 121, therefore the hooking portions 532 of the blocks 53 separate from the hooking protrusions 517 of the connecting parts 51, and the lateral tubes 121 pivot down to get close to the rear support members 14. And, the rear support members 14 are pivoted close to the front support member 11. Thus, the size of the stroller is reduced in three dimensions, i.e. height, width, and length. In addition, in folding the stroller, a part of force applied to the handle 12, the seating frame 2, and the support members 11, 14 can be imparted to each other via the operating rod combination 3 as well as the auxiliary operating rod combination 4 so that they are moved close to each other with increased ease of folding.

Figure 12:
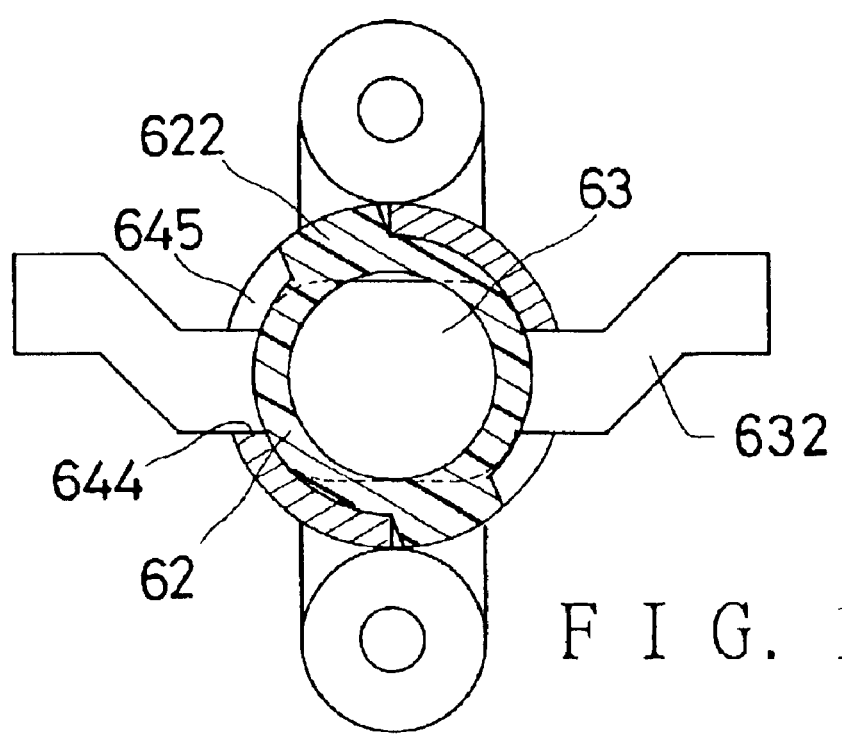
FIG. 12 is a partial top view of the joining member of the handle of the present foldable stroller.

Furthermore, referring to FIGS. 3 and 12, a front extension member 55 is disposed at the front of the stroller; the front extension member 55 has an U-shaped body 552, convexly curved shape 552 at two ends, and through holes 553 near the ends; the front extension member 55 is connected to the front support member 11 with fixing elements 554 passing through the holes 553 as well as the rods of the support member 11; the convexly curved ends 552 abut the concavely curved edges 516 of the connecting parts 51 when the stroller is in the unfolded position.

Figure 8:
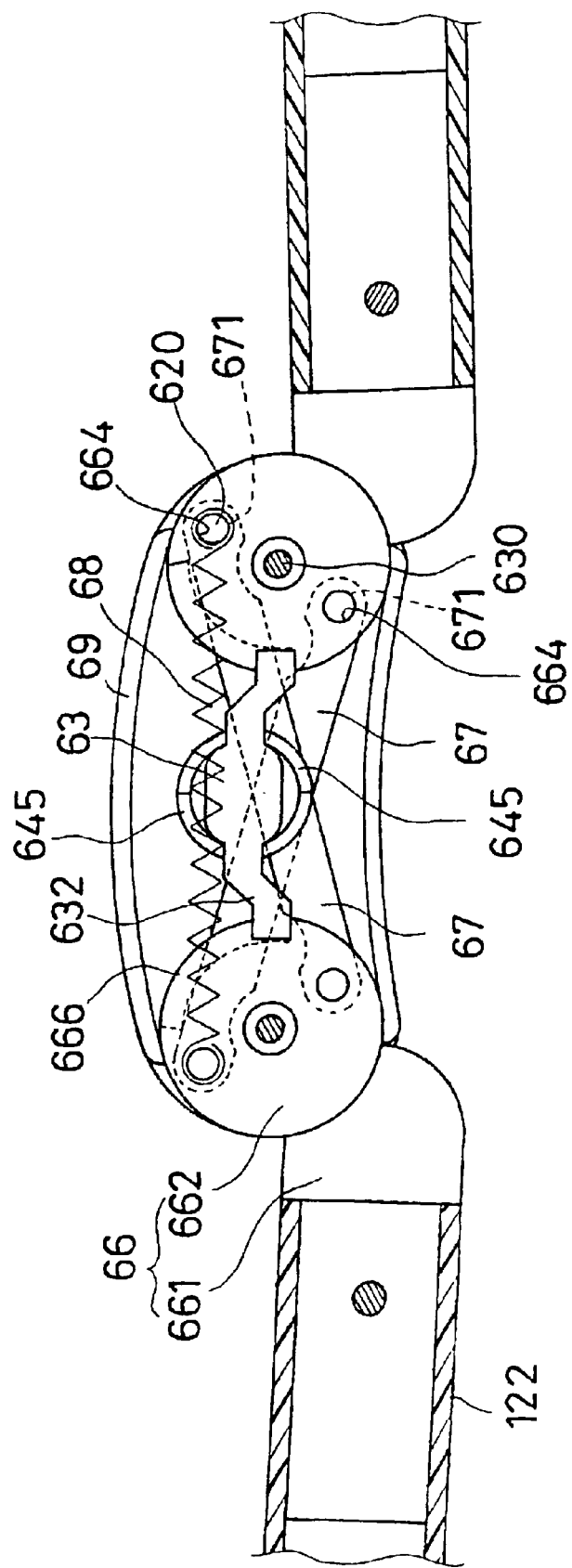
FIG. 8 is a top view of the joining member of the handle of the present foldable stroller.
Figure 9:
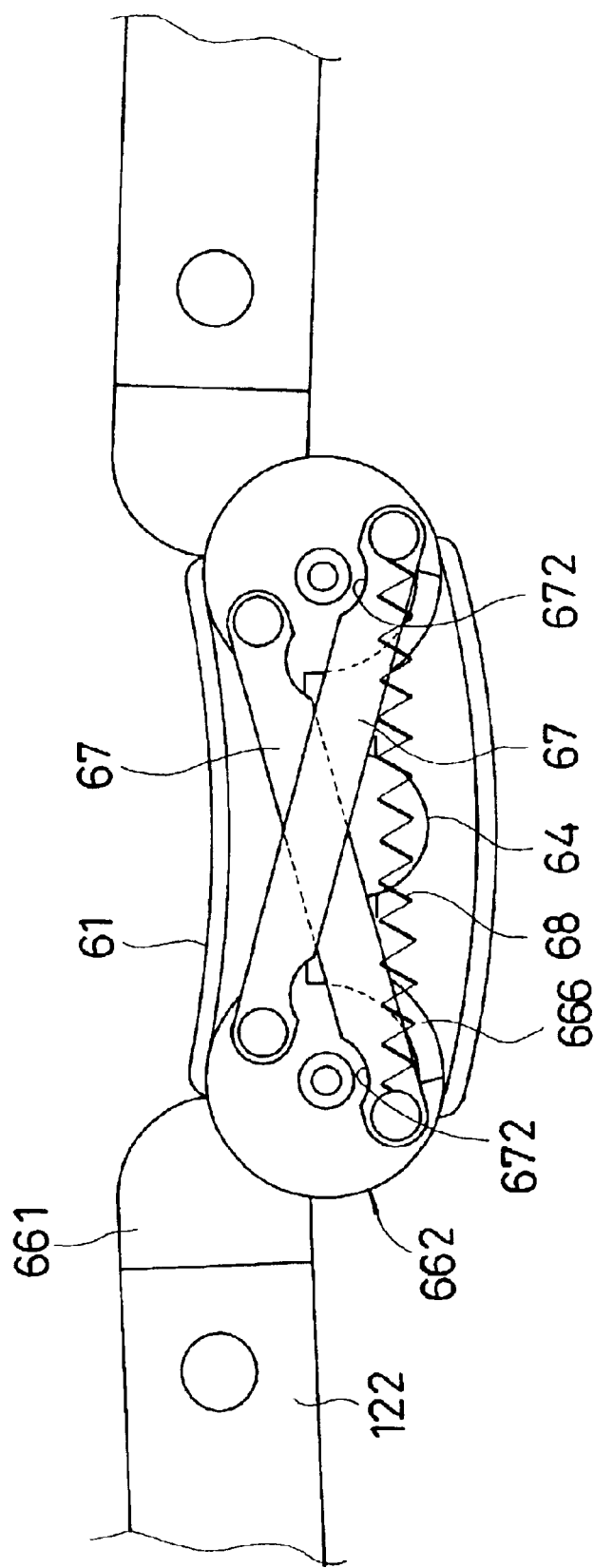
FIG. 9 is a bottom view of the joining member of the handle of the present foldable stroller.

Referring to FIG. 3, the handle 12 is provided with hanging knobs 15, 15 on rear sides for allowing objects to be hung on, and the rods of the rear support member 14 are provided with lock elements 16, 16 so that the handle 12 can be kept close to the rear support member 14 without possibility of moving away from same when the stroller is in the folded position by means of connecting the lock elements 16 to the hanging knobs 15. Referring to FIG. 8, the co-moving plates 67 are arranged to cross each other, and are pivotally connected to a respective one of the engaging members 662 at the first ends with pins passed into holes 671 of the plates 67 and the connecting holes 664. The second ends of the co-moving plates 67 are pivotally connected to fixing pins 620 that are passed into the other connecting holes 664 for holding two ends of the pulling spring 68 so that part of force of the pulling spring 68 is imparted to the engaging members 662 of the joining parts 66 via the co-moving plates 67 to help the handle 12 to be folded; the co-moving plates 67 have lateral curved recesses 672 on those portions thereof that will, in the folding process, come into contact with joints of both the upper housing part 61 and the lower housing part 69, i.e. the holed poles 616, 691.

A pair of support plates 555 are pivotally connected to the front extension member 55 at first ends, and to the seating frame 2 at second ends so that the front extension member 55 can be supported in position when the stroller is used.

To stretch the stroller from the folded position, the handle 12 is pushed forwards so that the joining parts 66 turn on the joining member 6, and the lateral rods 121 turn about the central axes thereof while being pivoted on the shafts 515 (FIG. 12) to the unfolded position where they are parallel to the front support member 11 of the primary frame 1. At the same time, the pushing blocks 54 are turned relative to the engaging blocks 53 until the sloping edges 542 thereof are faced with the sloping edges 5312 of the engaging blocks 53 to allow the engaging blocks 53 to be moved further close to the pushing blocks 54 by means of the elastic member 534. Thus, the hooking portion 532 of the blocks 53 engages the hooking protrusions 517 of the connecting parts 51 again.

From the above description, it can be easily understood that the stroller of the present invention has the following advantages:

1. The lateral engaging projections 622 of the button 62 are disposed on the tops of the walls 641 of the control base 64 so as not to face the elongated gaps 644 of the control base 64 when the stroller is in the unfolded position, therefore the button 62 cannot be depressed accidentally which would cause the unintentional folding of the stroller.
2. The pulling spring 68, and the co-moving plates 67 increase the smoothness with which the joining parts 66 of the handle 12 turn on joining member 6 when the stroller is being folded, thereby making the folding process relatively easy.

3. The stroller can be folded into a relatively small size because it is folded in three dimensions. In other words, the length, height, and width are all reduced when the stroller is folded. Consequently, the folded stroller occupies relatively less space for storage and transportation.

4. Because the stroller is provided with the operating rod combination 3 and the auxiliary operating rod combination 4, a part of a force applied to the handle 12, the seating frame 2, and the support members 11, 14 is imparted to each other, allowing the the operating rod combination 3 and the auxiliary operating rod combination 4 to be moved close to each other with increased smoothness in the folding process.

What is claimed is:

1. A foldable stroller, comprising
   (a) a primary frame including:
      i. a front support member having two parallel rods,
      ii. a handle, the handle having two parallel lateral tubes, two bent tubes, and a joining member; the bent tubes being connected to an upper end of a respective one of the lateral tubes at one end; the bent tubes being each provided with an engaging member at other end; the engaging members being pivoted to two ends of the joining member; the joining member having a locking part separately engaging the engaging members to lock the bent tubes in stretched position; the joining member having a button depressible to make the locking part separate from the engaging members to allow the handle to be folded; the engaging members are connected to a pulling spring to bias the bent tubes towards each other when the locking part is disengaged from the engaging members; front wheels being fitted to lower ends of the front support member having two parallel rods; the button being turnable between an unlocked position where said button can be depressed and a locked position where said button can't be depressed, thus preventing the handle from being folded by accident;
      iii. a pair of first connecting members, the first connecting members being disposed at the lateral tubes;
      iv. a rear support member that includes, two parallel rods that are pivoted to the first connecting members at upper ends; rear wheels fitted to lower ends of the parallel rods of said rear support member;
      v. a pair of front joining members, the front joining members each having a locking combination, and a connecting part; upper ends of the front support member having two parallel rods being connected to the connecting parts; lower ends of the lateral tubes of the handle being connected to the locking combinations; the locking combinations being separated from the connecting parts when the lateral tubes turn about their longitudinal axes due to folding of the handle, thus allowing the lateral tubes to be moved close to the front support rods;
   (b) a seating frame shaped to support a seat and a back; the seating frame pivotally connected to intermediate portions of the front support member having two parallel rods at front portions of said rods thereof; the seating frame having branch extension sections extending beyond the rear support rods of the rear support member, and being pivotally connected to the intermediate portions of the rear support rods;
   (c) an operating rod combination, the operating rod combination having a pair of first connecting rods, and a co-moving rod; the connecting rods being pivotally connected to each other at intermediate portions; front ends, and rear ends of the connecting rods being pivotally connected to front ends of the seating frame, and lower ends of the rear support rods of the rear support member respectively; two ends of the co-moving rod being connected to one of the first connecting rods, and pivotally connected to a foldable footrest respectively; and,
   (d) an auxiliary operating rod combination, the auxiliary operating rod combination having a pair of second connecting rods, and a pair of curved rods; the second connecting rods being pivoted pivotally connected to each other at inner ends; the second connecting rods being pivotally connected to a respective one of the rear support rods at outer ends; the curved rods being pivotally connected to intermediate portions of the second connecting rods at first ends; the curved rods being pivotally connected to the branch extension sections of the seating frame at other ends; part of a force applied to the handle being imparted to the rear support rods of the rear support member, the seating frame, and the front support member having two parallel rods via the operating rod combination as well as the auxiliary operating rod combination for helping said auxiliary operating rods move close to each other in folding operation.

2. The foldable stroller of claim 1, wherein the joining member includes:
   (a) a housing having an upper part, and a lower part; the upper housing part having a holding hole;
   (b) the button having engaging projections projecting laterally from an outer side; the button being moveably passed through the holding hole of the upper housing part;
   (c) said locking part having two engaging ends and being disposed at a bottom of the button;
   (d) a control base, the control base having two opposing elongated gaps on annular walls thereof; the control base being fixed to the bottom of the upper housing part with the engaging ends of the locking part projecting outwardly from the elongated gaps; the locking part being biased up to an upper end of the control base by a spring; the engaging projections of the button constrained by the tops of the annular walls from moving down when the button is in a locked position; the engaging projections in apposition with the elongated gaps between the annular walls so that the button is in an unlocked position and can be depressed to move the locking part down to a lower end of the control base; and, the engaging members of the handle have unlocking trenches having upper sections, and lower sections longer than the upper sections; the engaging ends of the locking part being received in the upper sections of the unlocking trenches to engage the engaging members when positioned in the upper end of the control base; the engaging ends of the locking part being received in the lower sections for allowing the bent tubes of the handle to be pivoted on the joining member when positioned in the lower end of the control base; thus the bent tubes can be pivoted on the joining member by depressing the button that has been turned to the unlocked position.

3. The foldable stroller of claim 1, wherein the first connecting members have connecting tubes at upper ends, and engaging members at lower ends; the connecting tubes having connecting extension portions for insertion sections of lower ends of a canopy support to be connected thereto; the engaging members having opposing engaging protrusions on inner sides, and being affixed to the lateral tubes of the handle with the protrusions being fitted into engaging holes of the lateral tubes.

4. The foldable stroller of claim 1, wherein the locking combinations each has a pushing block, an engaging block, and a fixed block; the pushing blocks being fixedly fitted around the lateral tubes of the handle; the pushing blocks having lower extension portions having sloping edges; the engaging blocks being movably fitted around the lateral tubes under the pushing blocks; the engaging blocks having upper recessed portions having sloping edges separably faced with the sloping edges of the pushing blocks; the engaging blocks having hooking portions extending upwards to reversibly engage hooking protrusions of the connecting parts that extend downwards; the engaging blocks being biased up with elastic elements to contact the pushing blocks; the fixed blocks being pivoted to the connecting parts and connected to lateral curved slots of lower ends of the lateral tubes by shafts so that the pushing blocks depress the engaging blocks so as to disengage the hooking protrusions when the lateral tubes are rotated in folding the handle, allowing the lateral tubes to be pivoted on the connecting parts.

5. The foldable stroller of claim 2, wherein the upper housing part has two pairs of stopping walls projecting down from a bottom side; stopping walls of each of the pairs having a gap in between for allowing the engaging ends of the locking part to be passed through.

6. The foldable stroller of claim 2, wherein the spring is fitted around a locating protrusion of a lower side of the locking part at an upper end, and is fitted around a locating protrusion of the control base at a lower end.

7. The foldable stroller of claim 2, wherein the control base has holed connecting ears sticking sideways from the annular walls, and is secured to the upper housing part with bolts being passed through the connecting ears and screwed into corresponding holes of the connecting poles of a bottom side of the upper housing part.

8. The foldable stroller of claim 2, wherein a pair of co-moving plates are pivoted to a respective one of the engaging members at first ends; the co-moving plates are pivoted to fixing pins used for positioning two ends of the pulling spring at second ends so that the plates are arranged in a crossing manner, and part of force of the pulling spring is imparted to the engaging members via the co-moving plates to help the handle to be folded; the co-moving plates having curved recesses on lateral sides on portions thereof that will contact joints of both the upper housing part and the lower housing part during the process of folding.

9. The foldable stroller of claim 1, wherein the foldable footrest is positionally adjustable.

10. The foldable stroller of claim 1, wherein the rear branch extension sections extending beyond the rear support rods of the rear support member of the seating frame are connected to a basket so that the basket is held in position.

11. The foldable stroller of claim 1, wherein the handle is provided with hanging knobs on rear sides for allowing objects to be hung on said hanging knobs.

12. The foldable stroller of claim 1, wherein the handle is provided with hanging knobs on rear sides for allowing objects to be hung on said hanging knobs, and the parallel rods of the rear support member are provided with lock elements so that the handle can be kept close to the rear support member without a possibility of said handle moving away from said rear support member when the stroller is in folded position by connecting the lock elements to the hanging knobs.

13. The foldable stroller of claim 1, wherein a front extension member is connected to the front support rods at two ends, and is held in position by a pair of support plates, which are pivotally connected to the front extension member at first ends, and to the seating frame at second ends.

14. The foldable stroller of claim 4, wherein the connecting parts of the front joining members have a concavely curved shape at front edges, and a front extension member having a convexly curved shape at two ends is connected to the front support rods to abut the concavely curved edges of the connecting parts from the convexly curved ends thereof.

* * * * *